(12) United States Patent
Adaboina et al.

(10) Patent No.: US 12,512,199 B2
(45) Date of Patent: Dec. 30, 2025

(54) SELECTIVE AUTOMATIC PROCESSING OF AUTHORIZATIONS BASED ON POPULATION RELATED DATA

(71) Applicant: Evernorth Strategic Development, Inc., St. Louis, MO (US)

(72) Inventors: Malla Reddy Adaboina, Edison, NJ (US); Moses Vaughan, Nutley, NJ (US)

(73) Assignee: Evernorth Strategic Development, Inc., St. Louis, MO (US)

( * ) Notice: Subject to any disclaimer, the term of this patent is extended or adjusted under 35 U.S.C. 154(b) by 242 days.

(21) Appl. No.: 18/213,566

(22) Filed: Jun. 23, 2023

(65) Prior Publication Data

US 2023/0352137 A1 Nov. 2, 2023

Related U.S. Application Data

(63) Continuation-in-part of application No. 17/555,704, filed on Dec. 20, 2021, now abandoned.

(51) Int. Cl.
*G16H 20/10* (2018.01)
*G06F 21/60* (2013.01)

(52) U.S. Cl.
CPC ........... *G16H 20/10* (2018.01); *G06F 21/604* (2013.01)

(58) Field of Classification Search
CPC ........ G06Q 10/00–50/00; G16H 10/00–80/00; G06F 1/00–2123/00
USPC ............................................... 705/7.11–7.42
See application file for complete search history.

(56) References Cited

U.S. PATENT DOCUMENTS

| | | | |
|---|---|---|---|
| 7,689,318 B2 | 3/2010 | Draper | |
| 8,935,272 B2 | 1/2015 | Ganti | |
| 8,984,606 B2 | 3/2015 | Kamat | |
| 9,349,233 B2 | 5/2016 | Muecke | |
| 9,547,692 B2 | 1/2017 | Poulsen | |
| 9,569,592 B2 | 2/2017 | Heffron | |
| 9,679,114 B2 * | 6/2017 | Iantorno | G16H 50/20 |
| 9,741,197 B2 | 8/2017 | Ghouri | |

(Continued)

OTHER PUBLICATIONS

Shah, Neel, Darryl Willick, and Vijay Mago. "A framework for social media data analytics using Elasticsearch and Kibana." Wireless networks (2022): 1-9.

(Continued)

*Primary Examiner* — Alan S Miller
(74) *Attorney, Agent, or Firm* — Jordan IP Law, LLC

(57) ABSTRACT

Technology identifies at least one object part of provided data from an object repository that corresponds to provided objects that were provided from the object repository, and extrapolates a first attribute associated with a condition based on the at least one object part. The technology receives a request for a first object associated with a first user and the condition. The technology determines whether to execute an automatic process to determine whether to permit the request based on the first attribute, when the automatic process is determined to be executed to determine whether to permit the request, automatically analyzes user data of the first user and an object attribute associated with the first object to determine whether to permit the request, and when the automatic process is determined not to be executed, assigning the request to a queue for a manual review to determine whether to permit the request.

17 Claims, 24 Drawing Sheets

(56) References Cited

U.S. PATENT DOCUMENTS

| | | |
|---|---|---|
| 9,770,389 B2 | 9/2017 | Koike |
| 9,779,215 B2 | 10/2017 | Rosenblum |
| 9,785,751 B2 | 10/2017 | Muecke |
| 9,805,430 B2 | 10/2017 | Miasnik |
| 9,833,384 B2 | 12/2017 | Yasunaga |
| 10,007,764 B2 | 6/2018 | Kim |
| 10,068,107 B2 | 9/2018 | Perelman |
| 10,315,851 B2 | 6/2019 | Greyshock |
| 10,318,875 B2 | 6/2019 | Avegliano |
| 10,426,706 B2 | 10/2019 | Shoji |
| 10,437,810 B2 | 10/2019 | Sarkar |
| 10,709,642 B2 | 7/2020 | Conlon |
| 11,056,242 B1* | 7/2021 | Jain ............... G16H 10/60 |
| 11,222,094 B1 | 1/2022 | Walton |
| 11,322,260 B1* | 5/2022 | Jain ............... H04W 4/021 |
| 11,804,303 B2* | 10/2023 | Barrett ............ G16H 50/80 |
| 2003/0167189 A1* | 9/2003 | Lutgen ............ G16H 70/60 705/3 |
| 2004/0103220 A1 | 5/2004 | Bostick |
| 2004/0225200 A1* | 11/2004 | Edmundson ......... G16Z 99/00 128/923 |
| 2007/0043469 A1 | 2/2007 | Draper |
| 2007/0143317 A1 | 6/2007 | Hogue |
| 2009/0194104 A1* | 8/2009 | Van Sickle ........ G16H 40/63 128/203.12 |
| 2009/0281656 A1 | 11/2009 | Draper |
| 2013/0297333 A1* | 11/2013 | Timmons ........... G16H 20/10 705/2 |
| 2014/0048593 A1 | 2/2014 | Hoganson |
| 2015/0127145 A1 | 5/2015 | Kim |
| 2016/0022541 A1 | 1/2016 | Dalal |
| 2016/0117471 A1 | 4/2016 | Belt |
| 2016/0350508 A1* | 12/2016 | Howard ............ G16H 70/40 |
| 2016/0367440 A1 | 12/2016 | Chervinsky |
| 2017/0053098 A1 | 2/2017 | Hawkins |
| 2017/0061095 A1 | 3/2017 | Waskin |
| 2017/0076065 A1 | 3/2017 | Darr |
| 2017/0083686 A1 | 3/2017 | Hawkins |
| 2017/0103172 A1 | 4/2017 | Fink |
| 2017/0109493 A1* | 4/2017 | Hogg ............... G16H 50/30 |
| 2017/0132393 A1 | 5/2017 | Natarajan |
| 2017/0161617 A1 | 6/2017 | Avegliano |
| 2017/0329840 A1 | 11/2017 | Mcgowan |
| 2017/0371942 A1 | 12/2017 | Baumgaertel |
| 2018/0172799 A1 | 6/2018 | Meadow |
| 2018/0261313 A1 | 9/2018 | Kim |
| 2019/0183736 A1 | 6/2019 | Hong |
| 2019/0365607 A1 | 12/2019 | Kugler |
| 2020/0126031 A1 | 4/2020 | Whalen |
| 2020/0251219 A1 | 8/2020 | Fukunishi |
| 2021/0035400 A1* | 2/2021 | Flynn .............. G07F 11/54 |
| 2021/0151159 A1 | 5/2021 | Childress |
| 2022/0262527 A1* | 8/2022 | Kupersmith ....... G16H 50/20 |

OTHER PUBLICATIONS

Shaik, Subhani, N. Naga, and M. Rao. "A review of elastic search: performance metrics and challenges." International Journal on Recent and Innovation Trends in Computing and Communication 5.11 (2017): 222-229.

* cited by examiner

SELECTIVE AUTOMATIC PROCESSING OF AUTHORIZATIONS BASED ON POPULATION RELATED DATA

CROSS-REFERENCE TO RELATED APPLICATIONS

The present application claims the benefit of priority to U.S. patent application Ser. No. 17/555,704 (filed on Dec. 20, 2021), which is hereby incorporated by reference in its entirety.

TECHNICAL FIELD

Examples generally relate to a computing architecture that is capable of identifying attributes based on provided objects to determine whether to execute an expedited process to permit a requests for a first object. In detail, the computing architecture tracks provided objects, identifies the attributes based on the provided objects and can execute an expedited process to permit the request based on the attributes.

BACKGROUND

Pharmaceutical fulfillment systems fill a large number of prescription orders with a variety of medications. For example, a prescriber can issue a prescription. A pharmacist fills each prescription order by placing a specific quantity of medication in a container. The medications can then be provided to a consumer who placed the prescription order. For example, a logistics company can transport each container in a shipping package to the consumer who placed the prescription order. While some medications are unaffected by temperature and can be delivered to consumers in standard shipping packages, others must be stored within a specific temperature range. These temperature-sensitive medications are typically delivered to consumers in temperature-controlled shipping packages, such as various types of coolers.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computing system that includes a processor. The system also includes a memory having a set of instructions, which when executed by the processor, causes the computing system to extrapolate a first attribute associated with a condition based on the at least one object part and receive a request for a first object, where the first object is associated with a first user and further where the first object is associated with the condition. The set of instructions, which when executed by the processor, causes the computing system to determine whether to execute an automatic process to determine whether to permit the request based on the first attribute. When the automatic process is determined to be executed to determine whether to permit the request, the set of instructions, which when executed by the processor, causes the computing system to automatically analyze user data of the first user and an object attribute associated with the first object to determine whether to permit the request. When the automatic process is determined not to be executed, the set of instructions, which when executed by the processor, causes the computing system to assign the request to a queue for a manual review to determine whether to permit the request. Other examples of this aspect include corresponding computer systems, apparatus, and computer programs recorded on one or more computer storage devices, each configured to perform the actions of the methods.

One general aspect includes a computer readable storage medium comprising a set of executable program instructions, which when executed by a computing system, cause the computing system to identify at least one object part of provided data from an object repository, where the provided data corresponds to provided objects that were provided from the object repository and extrapolate a first attribute associated with a condition based on the at least one object part. The set of executable program instructions, which when executed by the computing system, causes the computing system to receive a request for a first object, where the first object is associated with a first user, where the first object is associated with the condition. The set of executable program instructions, which when executed by the computing system, causes the computing system to determine whether to execute an automatic process to determine whether to permit the request based on the first attribute. When the automatic process is determined to be executed to determine whether to permit the request, the set of executable program instructions, which when executed by the computing system, causes the computing system to automatically analyze user data of the first user and an object attribute associated with the first object to determine whether to permit the request. When the automatic process is determined not to be executed, the set of executable program instructions, which when executed by the computing system, causes the computing system to assign the request to a queue for a manual review to determine whether to permit the request. Other examples of this aspect include corresponding computer systems, apparatus, and computer programs recorded on one or more computer storage devices, each configured to perform the actions of the methods.

One general aspect includes a method that includes identifying at least one object part of provided data from an object repository, where the provided data corresponds to provided objects that were provided from the object repository, and extrapolating a first attribute associated with a condition based on the at least one object part. The method further includes receiving a request for a first object, where the first object is associated with a first user, where the first object is associated with the condition. The method further includes determining whether to execute an automatic process to determine whether to permit the request based on the first attribute. When the automatic process is determined to be executed to determine whether to permit the request, the method includes automatically analyzing user data of the first user and an object attribute associated with the first object to determine whether to permit the request. When the automatic process is determined not to be executed, the method includes assigning the request to a queue for a manual review to determine whether to permit the request. Other examples of this aspect include corresponding computer systems, apparatus, and computer programs recorded on one or more computer storage devices, each configured to perform the actions of the methods.

Various examples are described in detail below, or will be apparent to one skilled in the art based on the disclosure provided herein, or can be learned from the practice of the disclosure. It should be understood that the above brief summary is not intended to identify key features or essential components of the examples, nor is it intended to be used as an aid in determining the scope of the claimed subject matter as set forth below.

BRIEF DESCRIPTION OF THE DRAWINGS

A detailed description of various exemplary examples of the disclosure is provided below with reference to the following drawings, in which.

DETAILED DESCRIPTION OF EXEMPLARY EXAMPLES

Figure 1:
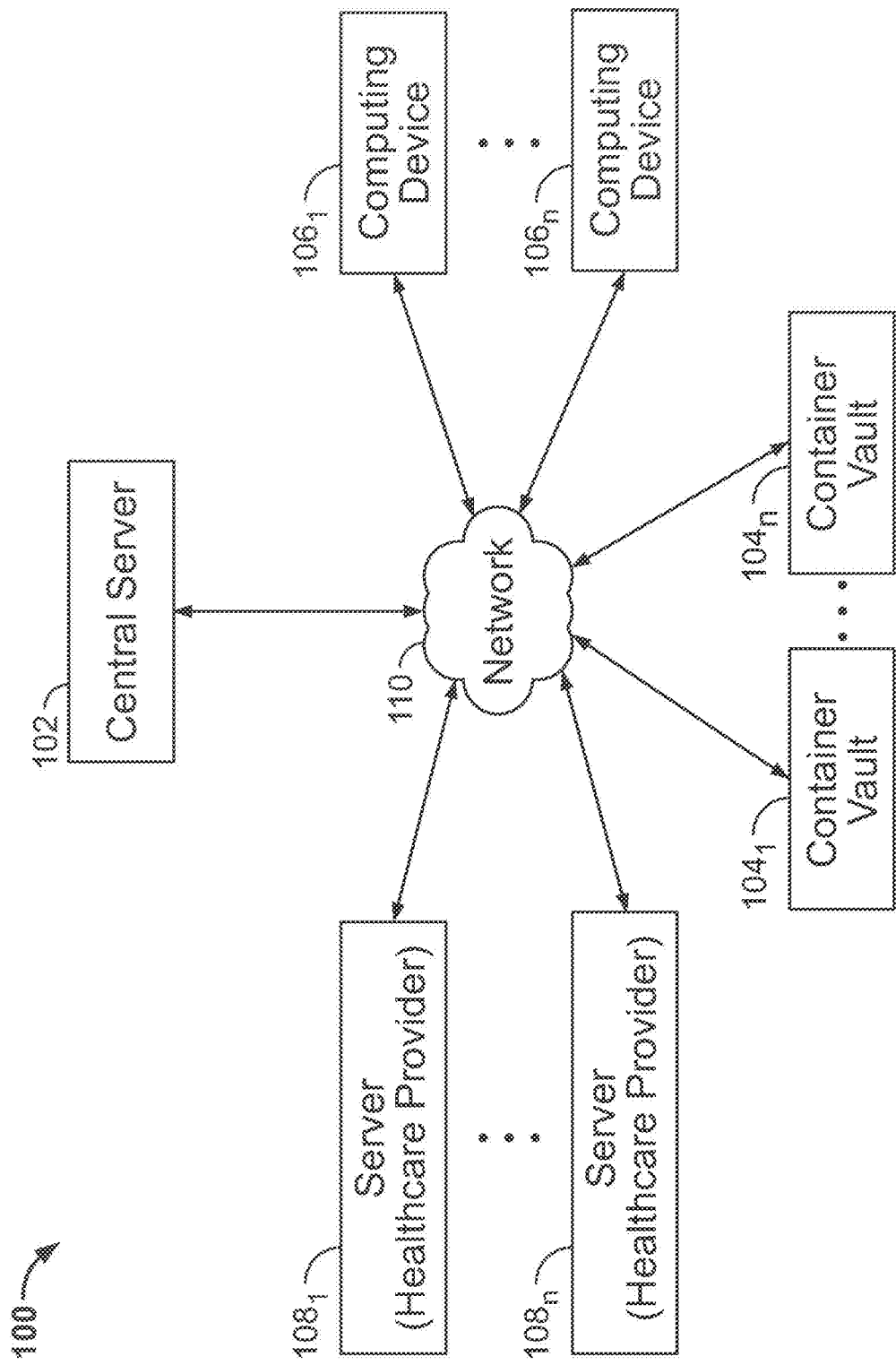
FIG. 1 is a network diagram of a container vault system in accordance with one embodiment of the invention.

Disease surveillance can include monitoring of disease characteristics. For example, disease surveillance allows the calculation of various disease characteristics such as disease incidence, disease prevalence, prevalence rate, hospitalizations and deaths. Disease incidence is the number of new disease cases reported over a specific period of time. Disease prevalence is the number of disease cases at one specific point in time. Disease hospitalizations is the number of disease cases resulting in hospitalization. Deaths is the number of disease cases resulting in death. Such disease characteristics are difficult to track and monitor. Data related to the disease surveillance often time lags behind actual disease spread and counts. Furthermore, monitoring of such disease characteristics can be time consuming and require cumbersome and inefficient processes. In some cases, the monitoring cannot be executed in real-time, and is thus a lagging indicator at best, sometimes being outdated and unreliable. Furthermore, such monitoring is oftentimes prone to human error and judgment, resulting in incorrect data and increased delays.

Furthermore, logistical difficulties are associated with remedial measures for disease mitigation even when an increase in disease characteristics is identified. For example, objects, such as medications, can be prescribed to treat a disease and reduce the spread of the disease. Authorizing and dispensing the medications can be a multi-step process which can be time-consuming and involve significant human resources.

Such a delayed response can exacerbate the disease spread and impact. For example, the disease can rapidly spread among communities and/or impact such communities if people within the communities are unable to obtain medications to treat and/or prevent the disease in a timely fashion. Doing so can increase the disease incidence, disease prevalence, prevalence rate, hospitalizations and deaths. For example coronavirus can rapidly spread throughout communities if medications are not readily available. Thus, current implementations rely on outdated disease characteristics and provide a sluggish response to disease spread.

Some examples relate to an enhanced computing architecture that is able to track treatment characteristics (e.g., first characteristics) in real-time. The treatment characteristics can correspond to the disease characteristics of the disease. When the treatment characteristics are identified as being associated with an increase in disease incidence, prevalence rate, disease incidence, disease prevalence, hospitalizations and/or deaths, examples can execute an enhanced process to provide medications in an expedited manner by bypassing lengthy operations for approving and distributing the medications. For example, medications can be automatically stockpiled, shipped and/or positioned to mitigate and/or reduce effects of the disease. Further, some examples can reduce an approval process for the medications to rapidly provide such medications expediently to diseased patients.

For example, the disclosed examples can provide systems and methods to gauge treatment characteristics in real-time based on the dispensation of medication (e.g., the treatment characteristics can be the amount of medication that is dispensed over a certain time period). The medication can be associated with treatment of a particular disease (the medication is intended to treat the particular disease). Thus, as the dispensation of the medication increases, examples can readily identify that the disease incidence, prevalence and/or rate is also correspondingly increasing. Thus, the dispensation of medication corresponds to the disease incidence, prevalence and/or rate.

When the treatment characteristic, disease incidence, prevalence and/or rate reaches a threshold, examples can begin to execute an expedited, automated and enhanced procedure to approve medications, reducing the latency for the medications to be received and consumed by patients. Some examples can also pre-emptively position the medications to reduce a shipment time for the medications to reach a patient. For example, medications can be pre-emptively provided to container vaults and/or pharmacies for future distribution (e.g., before the patients require the medication and based on future projected demand). Thus, some examples can significantly impact medical resources by effectively and quickly mitigating disease spread and impact.

Furthermore, examples can balance compute resources against human resources. For example, computing resources can be conserved until the disease spread is identified as being significant (e.g., treatment characteristic meets a threshold), and then execute an automated process to approve and distribute medications rapidly and efficiently. Thus, examples reduce processing time and resources to monitor diseases and provide medications to mitigate the diseases in an expedited fashion. As such, examples reduce delays, balance compute resources against disease mitigation and enhance patient outcomes.

Some examples further include a machine learning prediction model (e.g., a neural network) that is trained based on a large dataset to effectively model current and future treatment characteristics, and to determine whether patients should receive medications. For example, the machine learning prediction model can determine whether to authorize dispensation of medication and/or model current treatment characteristics, and can do so in real-time to form decisions in a timely manner based at least on the dispensation of medications as well as other factors (e.g., county data, geographic data, season, pharmacy information, patient information, drug information, drug usage information etc.).

In this way, the disclosed examples improve the overall process of providing health care and specifically improve the efficiency at which health information is received and analyzed to generate recommendations for medication dispensation and medication positioning. Moreover, examples herein can implement machine learning to train on sizeable and comprehensive datasets to generate the recommendations. Doing so enables several technical enhancements, including removing human subjectivity from decision making (e.g., treatment characteristic identification, prescription authorization and medical treatment). Removing human latency and decision-making for such recommendations and enables a more consistent approach to medication dispensation and enhances the overall process of medication approval and dispensation.

Thus, embodiments result in several technical enhancements and improves technological processes (e.g., computer-implemented automatic identification of treatment characteristics in real-time and automatic approval processes to efficiently distribute medication based on the treatment characteristics). By removing human subjectivity, disease spread, health conditions and optimal medications are accurately assessed. Based on the accurate assessment, early medical interventions are implemented to minimize patient impact while balancing computing resources against the urgency of disease mitigation. For example, once a disease is identified as being prevalent in a community, medications can be automatically approved to mitigate the disease and/or reduce the probability of the disease spreading.

Moreover, yet another technical enhancement is faster speed and higher efficiency of identification of diseases and treatment, while also conserving computing resources by automatically, dynamically, and intelligently selecting when to execute with the automated process for approving the dispensation of medication. Yet another technical enhancement can include using a rigorous, computerized process to perform tasks in real-time that were not previously able to be performed by humans in real-time.

Figure 17:
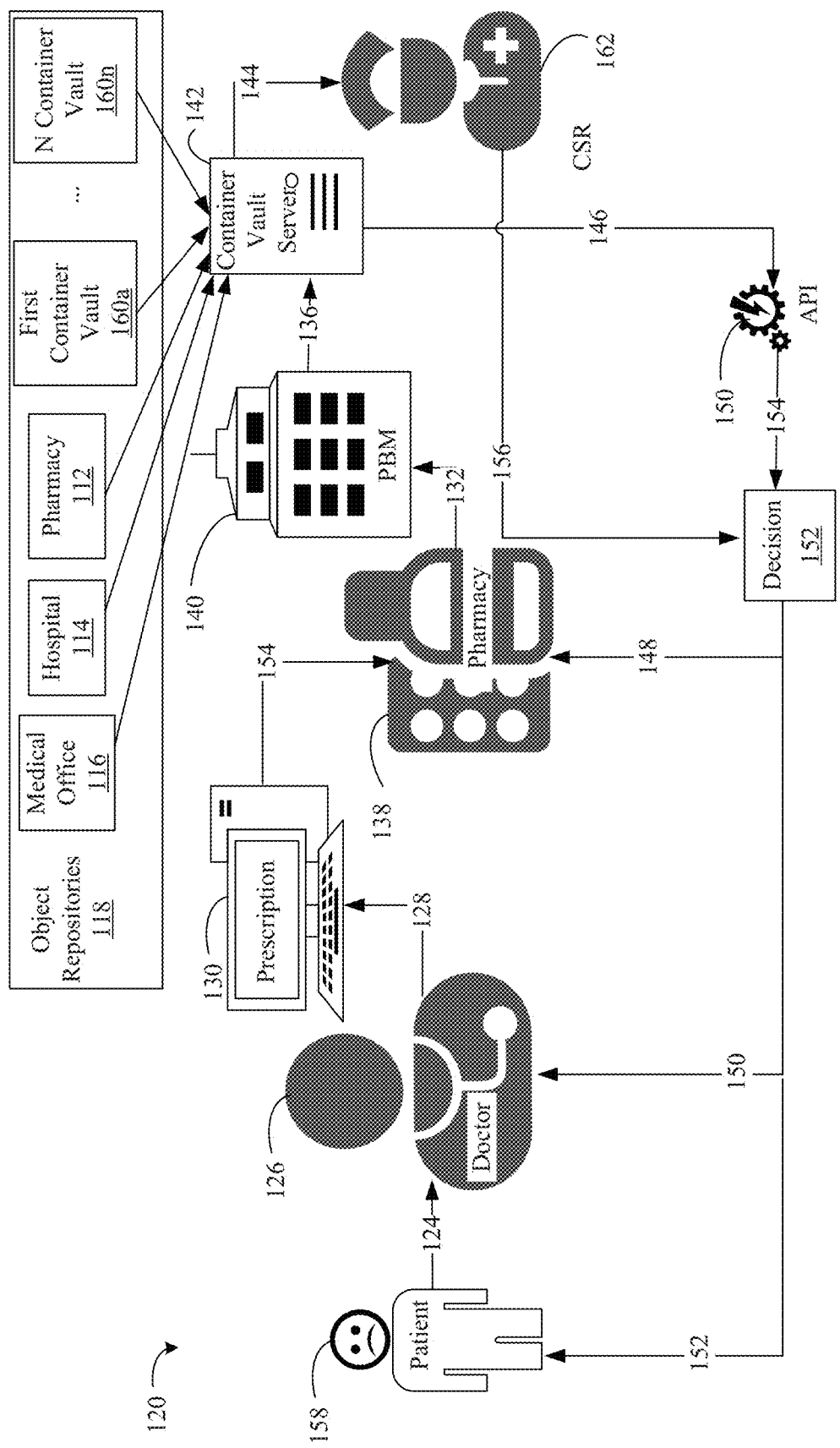
FIG. 17 is a diagram of an example of a process to determine whether to execute an automated medication approval process according to an embodiment.

Turning now to FIG. 17, a process 120 to determine whether to execute an automated medication approval process (e.g., an automatic process for approval of a request) is illustrated. In this example, a patient 158 can feel sick and have a disease (e.g., a condition). Thus, the patient 158 visits 124 the doctor 126 to receive treatment for the disease. The doctor 126 can diagnose the disease. The doctor 126 can then prescribe 128 a prescription for the patient 158. For example, the doctor 126 can enter the prescription and associated patient details for the patient 158 into the computing device 130. The computing device 130 can transmit 154 the prescription to a pharmacy 138 to fill the prescription.

Prior to filling the prescription, the pharmacy 138 contacts 132 a pharmacy benefits manager (PBM) for prescription benefits and a prior authorization for the prescription. The PBM 140 executes a prior authorization (PA) (e.g., a request) process to approve (e.g., permit) of disapprove (e.g., disallow) of the PA (e.g., a decision of whether the prescription should be fulfilled or denied).

That is, the PBM 140 is intended to safeguard the health of the patient 158 from the injurious effects of an improperly prescribed medication or medical procedure. For example, the PBM 140 can disapprove the PA when the PBM 140 determines that injurious effects can occur from the patient 158 receiving and utilizing the medication. If the PBM 140 determines that no injurious effects are likely to occur in the patient 158 because of the medication, the PBM 140 can approve the PA. The doctor 126 and/or pharmacy 138 initiates the PA process with the PBM 140. The PBM 140 stores (e.g., in a database) relevant medical records of the patients 158. In turn, the PBM 140 generates a case to track the prescription request of the doctor 126 and/or pharmacy 138. The prescription request is that the patient 158 receive a particular medication.

The Turnaround Time (TAT) between the pharmacy 138 and the PBM 140, including completion of the PA process (e.g., to verify the safety of a procedure or medication), should occur within a reasonable timeframe so that the patient 158 can timely receive the prescription or a notification of a denial of the prescription. Meeting the TAT is a measure of a credibility of the PBM 140. Failure to comply with the TAT measure can result in negative consequences and outcomes (e.g., a penalty from relevant regulatory bodies, unsatisfied clients, unsatisfied patients, exacerbation of disease, etc.).

The time frame for existing PA processes to complete can vary between days to months. Further, the existing PA processes have come under scrutiny from different parties (e.g., patients, doctors and governmental agencies) as being costly and time inefficient. That is, the mechanics of administering PAs has created an overly complex process that is costly, burdensome, inefficient (e.g., includes multiple people to review each prescription) and is time consuming. For example, existing PA processes often include frequently stalled and pending steps (e.g., waiting review from other personnel). Further, existing PA processes include an appeals process should the patients and/or providers disagree with the decision of denial. Thus, existing PA processes are sub-optimal in several respects noted above.

In some examples, the number of PAs can approach significant numbers (e.g., 5 million cases annually). As such, completing such a significant number of PAs can become problematic and lead to significant delay. Thus, delays in processing the PAs can result in severe backlogs worsening, affecting medication dispensation and consequently disease mitigation and patient health.

Therefore, some examples can selectively automate the decision-making process to reduce manual efforts and decrease overheads associated with existing PA processes (e.g., claim reviews). That is, rather than having a human operator forming a subjective decision as to whether the PA should be approved or disapproved based on a limited knowledge base, an automated, objective process can be executed based on a large body of knowledge and data. For example, a container vault server 142, which can be part of the PBM 140, can identify the PA request 136. The container vault server 142 can determine whether the PA process is to be manually executed or automatically executed based on treatment characteristics. The container vault server 142 can also be referred to as an "object repository server" in some examples.

In some situations, manual (e.g., human) PA review is preferred over automated PA review. While automated systems can provide efficiency and streamline the process, some aspects of PA can be better executed based on human involvement. For example, the following scenarios can illustrate situations where human review is often preferred. In some examples, the container vault server 142 can analyze aspects of the claim and associated details to determine whether a manual or automatic review should be executed. Thus, some examples can analyze claims to determine whether to execute an automated process or a manual process is to be executed based on one or more characteristics being identified below. If the one or more characteristics are identified, a manual review can be executed.

Firstly, some complex and/or ambiguous cases can be executed in a manual manner. Automated systems may have difficulty to handle complex and/or ambiguous cases that require subjective judgment (e.g., are the symptoms of a patient genuine or faked to receive medication, emotional state of a patient, is an emotional understanding of a patient required, etc.), analysis of patients, and/or a deeper understanding of clinical nuances. Human reviewers, particularly experienced healthcare professionals, can better evaluate the medical necessity of certain treatments or procedures and make informed decisions. Thus, the one or more characteristics include an identification of ambiguities or complexity in the claim.

Secondly, manual systems can be used when clinical documentation discrepancies arise. For example, there might be discrepancies or incomplete information in the clinical documentation submitted for PA. Human reviewers can review the documentation, contact healthcare providers directly, and request additional information or clarification, ensuring that decisions are based on accurate and complete data. Thus, the one or more characteristics include an identification of clinical documentation discrepancies.

Thirdly, manual systems can be used when unforeseen circumstances arise. For example, in some situations automated systems are not equipped to process unexpected situations or special cases that fall outside the scope of predefined algorithms. Human reviewers can exercise flexibility and adaptability in such scenarios, to consider unique patient circumstances or emerging medical research. Thus, the one or more characteristics include an identification of unforeseen arising during claims processing. In such a case, an automatic review can initially be executed, and then adjusted to a manual review.

Fourthly, manual systems can be used when provider-patient communication is predicted to occur. PA can sometimes involve complex discussions between healthcare providers and patients. Human reviewers can effectively communicate and address concerns, ensuring that patients understand the reasoning behind PA decisions and helping providers navigate the process more smoothly. Thus, the one or more characteristics include an identification of provider-patient communication.

Fifthly, manual processes can be used when appeals and exceptions arise. For example, when a PA request is denied, there can be a corresponding appeals or exceptions process. Human reviewers can carefully evaluate these cases, taking into account individual patient needs and the potential impact of denying the request, allowing for a more personalized and compassionate approach. Thus, the one or more characteristics include an identification of appeals and exceptions being predicted to occur.

It's worth noting that the preference for human or automated review may vary based on the specific healthcare system, available technology, and the complexity of the PA process in a given context. Some healthcare organizations may employ a hybrid approach that combines automated systems with human oversight to strike a balance between efficiency and human judgment.

The container vault server 142 can receive medication data (e.g., at least one object part of dispensed data corresponding to dispensed objects) from the first container vault 160a-N container vault 160n. The first container vault 160a-N container vault 160n may store provided data that includes the at least one object part, and corresponds to provided objects (e.g., different types of dispensed medications). As described below in further detail, object repositories 118 may operate similarly as to the first container vault 160a-N container vault 160n, and additionally provides a portion of the at least one object part. The first container vault 160a-N container vault 160n can dispense medications (or objects, described below with respect to FIGS. 1-16) to authorized individuals (e.g., patients that have approved prescriptions). For example, each container vault of the first container vault 160*a*-N container vault 160*n* can include compartments to store medication. The compartments can be opened by patients and the patients can then retrieve the medication from the compartments. Data related to the medications and retrieval can be recorded as the mediation data. Each respective vault of the first container vault 160*a*-N container vault 160*n* records the medication data. The medication data can include which medications are dispensed, a home and/or work location of each patient that retrieved medication from a respective vault of the first container vault 160*a*-N container vault 160*n*, and a timestamp corresponding to when each medication was retrieved by a patient. While medications are described herein, it will be understood that objects (e.g., masks, latex gloves, nebulizers, thermometers, medicine, etc.) associated with disease treatment can be incorporated into the examples herein.

While first container vault 160*a*-N container vault 160*n* are described in detail herein, it will be understood that the container vault server 142 can operate and/or execute with different repositories beyond first container vault 160*a*-N container vault 160*n*. For example, the container vault server 142 can retrieve data from any repository of object repositories 118. For example, the object repositories 118 can include repositories such as medical office 116, hospital 114, pharmacy 112 and first container vault 160*a*-N container vault 160*n*. The container vault server 142 can retrieve data from any of the repositories to identify trends within difference geofences around the object repositories 118. Thus, the disclosure related to the first container vault 160*a*-N container vault 160*n* described below is equally applicable to each of the object repositories 118. The object repositories 118 can include any repository that dispenses objects such as medications.

Each one of the first container vault 160*a*-N container vault 160*n* can have a geofence (i.e., a virtual fence or perimeter) that is centered around the physical location of the one of the first container vault 160*a*-N container vault 160*n*. The first container vault 160*a*-N container vault 160*n* can track local health afflictions of communities surrounding the first container vault 160*a*-N container vault 160*n* within the geofences.

For example, the first container vault 160*a* can have a first geofence disposed (e.g., centered) around a physical location of the first container vault 160*a*. The first geofence can be any shape, for example, circular, polygonal, etc. As will be discussed below, the first geofence can be adjusted based on locations associated with patients that retrieve medications from the first container vault 160*a*. For example, the first geofence can be adjusted to extend borders in areas where patients reside (e.g., the number of patients residing within a proximity to a border meets a threshold), and shrink (e.g., contract) borders in areas where patients do not reside (e.g., no patients live within the proximity to the border). The first geofence can be adjusted to include the home addresses and/or work addresses of all patients that retrieve medication from the first container vault 160*a*. In some examples, if a patient has both an associated home and work address, one of the home and work addresses that is closest to the first container vault 160*a* is associated with the first container vault 160*a*, while the other of the home and work addresses can be discarded and not associated with the first container vault 160*a*. Thus, the first geofence can be adjusted based on the one of the home and work addresses that is closest to the first container vault 160*a* but not the other of the home and work addresses. The other geofences of the other container vaults of the first-N container vaults 160*a*-160*n* can similarly be modified and generated.

In some examples, the geofences are based on a coordinate system. For example, the first geofence can be a 20 kilometer range from the first container vault 160*a*, and can define a certain area. In some examples, the geofences can each be defined to encompass a particular area, such as a district, town, city, metropolitan area, county, state, etc. In some examples, the geofences can be defined based on a first criteria (e.g., each geofence is a different county border or other particular area noted above), and then refined based on secondary criteria (e.g., home addresses and/or work addresses of patients that retrieve medication from the container vault). Another example of a first criteria to generate a geofence can be a certain radius around a medical facility (e.g., hospital, pharmacy, doctor's office, etc.) that is within a predetermined proximity to a container vault of the first-N container vaults 160*a*-160*n*, and further refine the geofence based on secondary criteria (e.g., home and work addresses of patients that retrieve medication from the container vault). Thus, the geofences can be adjusted to include communities that retrieve medications from the first-N container vault 160*a*-160*n*.

The first container vault 160*a* can provide medications to patients that have home and/or work addresses within the first geofence. The first geofence can be adjusted to include the home address of all patients that retrieve medication from the first container vault 160*a*. The medications dispensed from the first container vault 160*a*, time stamps for the dispensation of the medications and the area encompassed by the first geofence can be transmitted as part of the medication data. Thus, the medication data from the first container vault 160*a* can include an indication of the medicine dispensed by the first container vault 160*a* within the first geofence. Thus, each respective container vault of the first container vault 160*a*-160*n* container vault 160*n* can include an indication of the medication dispensed by the respective container vault within a geofence of the respective container vault, similarly to as noted above with respect to the first container vault 160*a*.

First-N container vaults 160*a*-160*n* can be a system to reduce risk associated with impersonating identities and misdirecting drugs, and thus committing fraud and potentially pharmaceutical drug abuse. The first-N container vaults 160*a*-160*n* are locker type facilities where each vault is within one of the first-N container vaults 160*a*-160*n*. The first-N container vaults 160*a*-160*n* can dynamically self-adjust for environmental factors such as temperature humidity and light such that contents are kept in perfectly optimal settings for holding the contents (e.g., medicines). The container vault system 142 and the first-N container vaults 160*a*-160*n* can identify powerful trends and data, which can be referred to as "community insights." Examples leverage resources from the medication data to streamline the PA process.

Thus, the medication data can include community health conditions (e.g., community health information) within each geofence. Some example can analyze the medication data to identify community health trends within different geofences. For example, a disease can be spreading through a geographic location within the first geofence, and can be tracked based on the medications dispensed by the first container vault 160*a*. For example, the medications can be used to treat the disease. Of note, is that the medications can be different from one another, but all used to treat the same disease. Thus, an increase in the dispensation of the medications can signal an increase in the prevalence, rate and/or incidence of the disease within a community encompassed by the first geofence. In some examples, each of the geofences can be analyzed to determine the medications dispensed within the geofence, and diseases within the geofence.

Thus, the container vault server 142 can identify the medication data associated with the container vaults 106a-106n, where the medication data (e.g., provided data) corresponds to different medications that are dispensed from the container vault server 142. The container vault server 142 receives a request for a PA process, which in this example is a request for the medication (e.g., first medication and/or a first object) associated with the patient 158 (e.g., a first user). The container vault server 142 determines whether to automatically identify whether to approve or disapprove of the request based on the medication data (e.g., trigger an automated process to execute the PA process). When the request is determined to be automatically identified, automatically analyze patient data associated with the patient 158 and usage data associated with the medication to determine whether to authorize the PA request.

In some examples, the container vault server 142 can identify a home location of the patient 158, and a disease that is to be treated with the medication of the prescription. The container vault server 142 can determine an encompassing geofence (e.g., the first geofence) from the geofences that encompasses the home and/or work address (location) of the patient 158. The container vault server 142 can determine a treatment characteristic (e.g., an attribute) of the disease within the encompassing geofence. The treatment characteristic can be how many times medications, which can be different from one another, were dispensed to treat the disease. If the treatment characteristic meets a threshold, an automatic PA process can be executed to reduce latency to dispense the medication to mitigate the disease spread, reduce impact of disease to afflicted communities, reduce potential hospital resources to treat patients that are unable to receive medications in a timely fashion, etc. For example, the treatment characteristic can be an amount of times (e.g., a treatment characteristic) that the first medication (which is used to treat a disease) was dispensed by the container vault of the first-N container vaults 160a-160n associated with the encompassing geofence. In some examples, the treatment characteristic can be further refined to not only be based on the amount (e.g., number) of times that the first medication was dispensed, but also a difference between the amount of times and a historical daily average of the amount of times that the medication is dispensed. If the difference meets the threshold, the automated PA process can be executed. The container vault server 142 analyzes the prescription request by comparing the amount of times to a threshold. If the amount of times meets the threshold, the automated PA process is executed. Otherwise, if the amount of times does not meet the threshold, a manual process (which can be longer than the automated PA process) can be executed to implement the PA process.

There are several situations when a manual PA process can be beneficial. There are also situations where alternating between automated and manual prior authorization can be a beneficial approach. Some of the aforementioned situations are described below.

In some situations, flexibility and adaptability can indicate that a manual PA process is to be executed. A manual PA allows for flexibility and adaptability in handling unique cases or unforeseen circumstances that automated systems may not be specifically designed and/or trained to address. Human reviewers can exercise judgment, consider individual patient needs, and make exceptions when necessary.

As another example, complex and/or ambiguous cases can benefit from manual processes. Certain medical cases can involve complex treatment plans and/or ambiguous clinical documentation. Human reviewers can better assess the medical necessity of such cases taking into account human expertise and understanding of clinical nuances.

Next, provider-patient communication can also indicate that manual processes are to be executed. PA can sometimes create confusion or anxiety for patients. Manual PA offers the opportunity for human reviewers to engage in direct communication with healthcare providers and patients, addressing concerns, explaining decisions, and ensuring that the process is well understood.

Further, appeal and exception handling can indicate that a manual process is to be executed. Manual PA is beneficial when appeals and/or exceptions to denied requests occur. Human reviewers can carefully evaluate the appeals, consider additional information, and make informed decisions based on individual patient circumstances.

Moreover, quality control can indicate that manual review is to be executed to serve as a quality control mechanism, ensuring that automated systems are functioning correctly and accurately processing prior authorization requests. Human oversight can help identify any errors or inconsistencies in the automated process and make necessary corrections.

By alternating between automated and manual prior authorization, healthcare organizations can leverage the benefits of both approaches. Automated systems can handle routine and straightforward cases efficiently, reducing the administrative burden and processing time. Manual review, on the other hand, can be reserved for more complex or exceptional cases where human judgment and expertise are crucial. This hybrid approach maximizes efficiency while ensuring that critical decisions are made with the necessary clinical insight and flexibility.

In some examples, the threshold is adjustable based on specific factors associated with the patient 158 (e.g., a user) and the encompassing geofence. For example, the threshold can be adjusted based on health conditions (e.g., user characteristics) of the patient. That is, if the patient has a health condition (e.g., high-blood pressure, diabetic, immunocompromised, elderly, etc.) that can negatively impact the patient, the threshold can be lowered so that the automated PA process is more likely to be executed to reduce the latency for the patient 158 to receive the medication. In some examples, the threshold is adjusted based on the disease. For example, if the disease is a highly contagious disease (e.g., Covid, Influenza, etc.) the threshold can be lowered. Furthermore, the threshold can be adjusted based on an attribute of the disease. For example, the threshold can be lowered if the disease has an attribute of being potentially deadly (e.g., stroke, heart attack etc.) and/or can result in permanent health problems (e.g., loss of vision, body aches, etc.).

Thus, examples can be more likely to execute the automated PA process when the patient is from a community that has an immediate need of medication because of a prevalence of the disease. In some examples, surrounding communities from adjacent geofences can be analyzed to determine disease characteristics of those surrounding communities. In such examples, the data from adjacent geolocation can be used to determine whether an automatic PA process is to be executed. Doing so can reduce the spread of disease between different areas encompassed by the geofences. For example, suppose that the first geofence of the first container vault 160a is within a predetermined proximity an N geofence of the N container vault 160*n* (e.g., partially overlap, first and N geofences border each other, first and N geofences border are within a distance of each other). If the amount of times that the first medication was dispensed by the N container vault 160*n* meets the threshold, then the automatic approval process can be executed for patients with addresses in the first geofence to reduce the risk of disease spread regardless of how many times the first medication was dispensed by the first container vault 160*a*.

The container vault server 142 and application programming interface (API) 150 minimizes the TAT in getting the medication. Doing so will significantly impact communities by mitigating disease spread and potentially saving the lives of many people with timely care, particularly in cases where community exposure should be limited as in pandemics (e.g., Covid). Existing PA systems do not have such an automated and selectively executable workflow and/or process as described herein. Further existing systems fail to enhance the PA process (e.g., decision process) based on the community needs by executing an objective process that can be completed in real-time (or near real-time) to provide medications in a timely manner. Infusing the above workflow/process into PA systems provides better and faster access of care via greatly diminished turnaround times. The API 150 can execute an automatic process for approval of a prescription (e.g., a request for medication).

In some examples, the first-N container vaults 160*a*-160*n* track medication over a lengthy time period so that the medication data includes a large number of dispensed medications. The container vault server 142 can determine whether to execute the automated PA process based on a smaller, moving window of time of the medication data to exclude analysis based on aged or older data (older instances of medication being dispensed). Doing so can provide more accurate snapshots of medical afflictions that are currently present in a community.

In some examples, the container vault server 142 can model future treatment characteristics (e.g., future user attributes). For example, the container vault server 142 can divide the medical data into time-based groups. That is, a first group (e.g., only include medication data from time t−3 to t−2) can represent a time period from t−3 to t−2, a second group (e.g., only include medication data from time t−2 to t−1) can represent a time period from t−2 to t−1, and a third group (e.g., only include medication data from time t−1 to t) can represent a time (e.g., only include medication data from time t−1 to a current time). The container vault server 142 can model how the treatment characteristic changes across the groups to predict the treatment characteristic during future time periods, such as times t to t+1, t+1 to t+2 and so on. If the predicted treatment characteristic meets the threshold, the automated PA process can be executed. For example, if the dispensed medication increases by 10% during each of the first, second and third groups, the dispensed medication can be predicted to increase by 10% from time t to t+1, and examples can decide whether to execute the PA process based on the predicted dispensed medication.

Thus, some examples set a geofence for a container vault of the first container vault 160*a*-N container vault 160*n*. Such examples can identify a population with locations (e.g., home and/or work addresses) within the geofence, wherein the population includes a plurality of patients (e.g., users) that retrieved the different medications from the container vault. Examples can then predict a future treatment characteristic for the population based on the medication data. To determine whether to execute the automatic approval process, examples determine whether to automatically analyze the request based on the future treatment characteristic.

The container vault server 142 can determine whether to call an API 150, 146 to execute the automated PA process, or call 144 a human resource 162 to execute a manual PA process. For example, when the automated PA process (e.g., an automatic process) is determined to not be executed for approval, examples can assign the request to an electronic queue (e.g., an electronic docket) for manual review of the request by the human resource 162. In some examples, the container vault server 142 can determine that the API 150 is to be called when the treatment characteristic meets the threshold. If the treatment characteristic does not meet the threshold, then the container vault server 142 will call 144 the human resource 162.

The API 150 can execute an analysis to determine whether to authorize a PA. For example (and as will be discussed with respect to FIG. 18), the API 150 can access personal health data of the patient 158, current medications of the patient 158, drug-drug interactions of the medicine associated with the prescription, etc. through an indexed search (e.g., Elasticsearch™) Indeed, the API 150 can execute in a matter of seconds to efficiently provide PA for the prescription. The human resource 162 on the other hand can take days, and even months, to execute the PA process. That is and as mentioned above, the human resource 162 can take significantly longer to analyze information and determine whether the medication is authorized. Further, the API 150 can be far more efficient and accurate than the human resource 162, analyzing numerous and current data sources in a few seconds to determine an optimal recommendation for the patient 158.

In some examples, the API 150 can access several different data points to generate a decision. The data points can include, a patient 158 member number, patient 158 group number, patient 158 carrier, patient 158 date-of-birth, patient 158 residence state, patient 158 residence city, patient 158 geography, patient 158 ZIP code, a drug name for the medication, existing conditions of the patient 158 and current medications of the patient 158.

Thus, either the human resource 162 or the API 150 generates 146, 156 the decision 152. The decision 152 is a PA approval or disapproval. The pharmacy 148, doctor 126 and patient 158 are notified of the decision 152. If the decision 152 is an approval of the PA, the pharmacy 148 can fulfill the prescription and the patient 158 can receive the medication associated with the prescription. In some examples, rather the pharmacy 138 can provide the medication to a container vault of the first-N container vaults 160*a*-160*n* for the patient to retrieve.

Thus, examples leverage community insights from the first-N container vaults 160*a*-160*n* based on analytical underpinnings which can provide community-based benefits. Given that each container within a container vault of the first-N container vaults 160*a*-160*n* is aware of contents within the container, some examples determine the aggregate of dispensed medications and analyze the dispensed medications to decipher the medical needs and afflictions of a community.

Logical geographic fencing (e.g., geofencing) can be created around each container vault structure of the of the first-N container vaults 160*a*-160*n* to evaluate and act upon noticeable trends. The geofencing and analysis described above can further be leveraged to notify and subsequently prepare local medical facilities for forthcoming medical trends (e.g., large diseased population) prior to the medical trends causing a significant setback. Examples of preparation include providing early insights to area medical facilities in the form of educational rubrics, with the latest in findings on the forthcoming condition, as well as insights of necessary medical supplies to treat such conditions, stocking of medicines, stocking of medical supplies etc.

The abstraction of such community disease spread described above with the first-N container vaults 160a-160n, can be applied to any pharmacy which submits claims to the PBM 140. Utilizing claim and predictive data, examples can reverse engineer drug trends into health afflictions to determine which areas have expanded bouts of medical issues such as coronavirus disease, human immunodeficiency virus and respiratory illness to name a few. The container vault server 142 and/or the API 150 can leverage community insights information to automate the decisions on certain medications, as the container vault server 142 and/or the API 150 has information about patients and corresponding medications of the patients. If the container vault server 142 and/or the API 150 receives the request for a particular medication more than a predetermined threshold (for example 60%) more than daily average within a predetermined radius of a container vault of the first-N container vaults 160a-160n, examples can expedite the PA process of such medications for patients within the predetermined radius. Examples can significantly enhance (e.g., reduce) the turnaround times and reduce the costs associated with the PA process. Examples will elevate the patient's care and act as a deterrent to future pandemics and overall faster access to care regardless of the situation, and decrease the burden on the national healthcare industry and system.

If the PA process results in an approval of the prescription, one container vault of the first-N container vaults 160a-160n associated with the patient 158 can be automatically stocked with the medicine associated with the prescription, and the patient 158 can retrieve the medicine from the one container vault. Some examples can pre-emptively stock further medicine related to the disease in the one container vault when the treatment characteristic meets the threshold, and based on a predicted future need (e.g., future patients that have the disease and need the medicine). Doing so can significantly reduce delays for a future patient to receive the medicine.

One or more aspects of the process 120 can be executed in a combination or software and/or hardware. For example, one or more aspects of the first-N container vault 160a-160n, container vault server 142, API 150, pharmacy 138, computing device 130 can be implemented in logic instructions (e.g., software), configurable logic, fixed-functionality hardware logic, computer readable instructions stored on at least one non-transitory computer readable storage medium that are executable to implement process 120, circuitry, etc., or any combination thereof.

Figure 18:
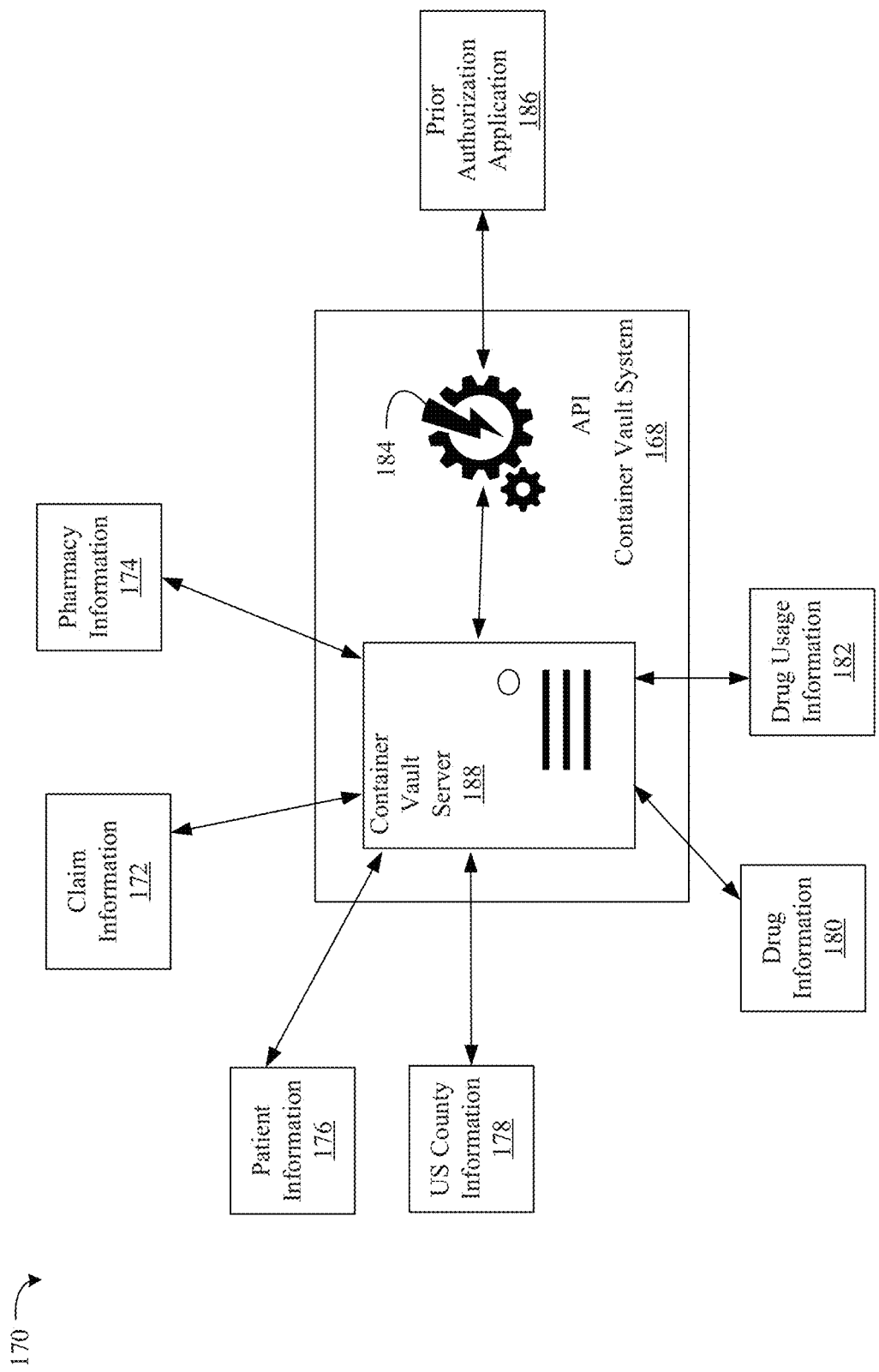
FIG. 18 is a diagram of an example of a prior authorization architecture with data sources according to an embodiment.

FIG. 18 illustrates a PA architecture 170. The PA architecture 170 can generally be implemented in conjunction with any of the embodiments described herein, for example the process 120 (FIG. 17). The PA architecture 170 can be readily substituted for the container vault server 142 and the API 150 of FIG. 17. one or more aspects of the container process 120 can be implemented in logic instructions (e.g., software), configurable logic, fixed-functionality hardware logic, computer readable instructions stored on at least one non-transitory computer readable storage medium that are executable to implement the PA architecture 170, circuitry, etc., or any combination thereof.

The PA architecture 170 includes a container vault system 168. The container vault system 168 accesses a plurality of databases and data sources. The container vault system 168 can provide data from the plurality of databases and data sources to the API 184 and/or the container vault server 188. The PA system 168 can combine disparate information from the different databases and data sources together to form a decision as to whether the API 184 is to be executed, and the API 184 can determine whether to approve or disapprove of a PA of a prescription based on the disparate information. For example, the container vault server 188 accesses pharmacy information 174 to retrieve medication data. The container vault server 188 accesses claim information 172 to retrieve claim information (e.g., prescription information for a patient) to process the PA. The container vault server 188 can also access patient information 176 (e.g., a historical medical data (e.g., historical data) of the patient undergoing a PA process, age of the patient, current medications (e.g., objects) consumed by the patient, health conditions (current conditions) of the patient, gender of the patient, etc.). The container vault server 188 can also receive US county information to determine the prevalence and/or incidence of disease, and determine whether to execute the API 194 based on the prevalence and or incidence.

The container vault server 188 can also access drug information 180 to determine information (e.g., a chemical makeup of a respective medicine of a prescription undergoing the PA process, drug-drug interactions of the medicine, composition of the medicine, side effects of the medicine, contra-indication of the medicine or an indication of the medicine, etc.). The drug information 180 can also include the disease(s) that the respective drug is intended to treat, age restrictions for the respective drug, whether the drug is targeted to a specific age group, drugs that should not be combined with the respective drug, etc. The container vault server 188 can also access drug usage information 182, which contains information relating to how the medicine is used.

The container vault server 188 can synthesize information from the various sources and determine whether to automate the PA process. When the container vault server 188 determines that the PA process is to be automated, the API 184 can execute the PA process. In such examples, the container vault server 188 can provide relevant, synthesized information to the API 184 so that the API 184 can execute the PA process. The API 184 outputs a PA application 186 (e.g., an approval or disapproval of the prescription). If the prescription is disapproved, a patient cannot receive the medicine of the prescription. If the prescription is approved, the patient can receive the medicine.

The container vault server 168 combines the information of patient, claims, drug, pharmacy and US county information to provide the comprehensive view of how medications are being dispensed from pharmacies to patients. The container vault system 168 combines the data from different sources like pharmacy information, patient information, claim information, US county information, drug national drug code (NDC) information and drug usage information to obtain a comprehensive view of the patient, community needs (e.g., the spreading of any disease) and drug interactions with patients. Furthermore, the container vault system 168 can combine the data to determine whether to execute the API 184, and execute the API 184 based on the data.

In some examples, the container vault server 188 receives data from the claim information 172, pharmacy information 174, patient information 176, US county information 178, drug information 180, drug usage information 182 in a first format (e.g., human readable format). The container vault server 188 can then modify the data from the first format, to a second format that is a machine-readable version (e.g., a human cannot understand and/or appreciate the data in the second format). The data in the second format can be efficiently processed by a computing device, such as the container vault server 188 and/or the API 184, to reduce computing time, power and resources. For example, the container vault server 188 can hash the data (in the first format) to generate hashed data (e.g., in the second format) that is efficiently processed. In some examples, the container vault server 188 can vectorize the data (in the first format) to generate vectorized data (e.g., in the second format) that is efficiently processed. The vectorized data can be N-dimensional and can contain vectors representing various drugs, drug usage information, etc. to facilitate low latency comparisons and data analysis. Data can be stored in a columnar format (e.g., all values of a column are stored as a single record). Given the larger footprint of potential data, storing data in a columnar format provides several benefits. Such benefits would range from efficient utilization of bandwidth throughout the storage hierarchy via the use of more efficient compression due to the data all being of the same type to speeding up data processing for highly efficient analytical queries. Given that these queries on this data are more analytical in nature it would be beneficial to fit for vectorized processing. In some examples, the container vault server 188 can modify the data in the first format, to a second data format that is a column-oriented data file format designed for efficient data storage and retrieval.

In some examples, the container vault system 168 can include a machine learning model (e.g., a neural network) that processes the data to determine whether to execute the API 184. In some examples, the API 184 can also be a machine learning model that determines whether to accept the PA. Regression supervised ML function (e.g., XGBoost) can be used to determine if a PA should be provided given member based on member, community, claim and drug data as well as past outcomes for training purposes. In addition demographic data, health history, pharmacy information, claim information, geospatial information, drug national drug code (NDC) information and drug usage information can be used to predict community needs and community health information at different points in the future.

In some examples, the machine learning model includes a regression supervised machine learning function (e.g., XGBoost) can be used to determine if a PA should be provided based on member data, community data, claim data and drug data as well as past outcomes for training purposes. In addition demographic data, health history, pharmacy information, claim information, geospatial information, drug national drug code (NDC) information and drug usage information can be used to predict community needs and community health information at different points in the future.

The container vault system 168 collects usage and claim metrics and produces a comprehensive view of prevalence conditions in the communities. The API 184, known as Community Insights API, for which consumers (such as the PA process), can use the time series analysis of data to track medical supply/drug usage for predetermined radii and reverse engineer to view how diseases/community afflictions has been spread in the concerned communities.

Thus, the container vault 168 collects information about drugs, drug usage, patients, claims, US county, pharmacy, etc. The container vault 168 combines all the information using elastic search by indexing the information. From this combined view of information, the container vault 168 produces a comprehensive view of prevalence conditions in different communities.

Claim information 172 can include a claim. A claim typically contain the following information:
1. Patient Information: the claim includes details about the patient for whom the medication was prescribed. This information may include the patient's name, date of birth, gender, address, and insurance information.
2. Prescriber Information: the claim includes information about the healthcare provider who issued the prescription. This typically includes the prescriber's name, National Provider Identifier (NPI), and contact information.
3. Medication Information: the claim includes details about the medication being dispensed. The details include the drug name, strength, dosage form, quantity, and directions for use. The details can also specify whether the medication is brand name or generic.
4. Dispensing Pharmacy Information: the claim contains information about the pharmacy that dispensed the medication. The information includes the pharmacy's name, address, NPI, and other identifying details.
5. Prescription Details: the claim includes specific details about the prescription, such as the prescription number, issue date, and the number of refills authorized, if applicable.
6. Insurance Information: the claim includes the patient's insurance information, such as the insurance company name, policy number, and group number. The claim can also include the patient's co-payment or co-insurance information.
7. Pricing and Billing Information: the claim includes the pricing and billing details associated with the medication. This includes the cost of the medication, any applicable discounts or rebates, and the amount to be billed to the insurance company and/or the patient.
8. Diagnosis and Procedure Codes: the claim can include diagnosis codes (e.g., ICD-10 codes) that indicate the medical condition for which the medication was prescribed. The diagnosis codes can also include procedure codes (such as NDC or HCPCS codes) that identify the specific medication or service provided.
9. Prior Authorization or Special Notes: if the medication requires PA, the claim can include relevant information and documentation to support the authorization request. The claim can also include any special notes or instructions from the prescriber.
10. Signature and Date: the claim can require the signature and date of the pharmacist who dispensed the medication, indicating that the prescription was filled accurately and in accordance with the prescription.

These are the common elements found in a pharmacy claim. The specific format and information required may vary depending on the healthcare system, insurance provider, and country.

Drug information 180 contains drug brand name, NDC, Drug Class etc. The drug usage information 182 provides information about drug usage, side effects and which age range can use a particular drug. Pharmacy information 174 provides, pharmacy location, state, county, zip and NPI. US county information 178 provides county's ZIP code and Federal Information Processing Standard (FIPS) information to represent the pharmacy during an elastic search.

Figure 19:
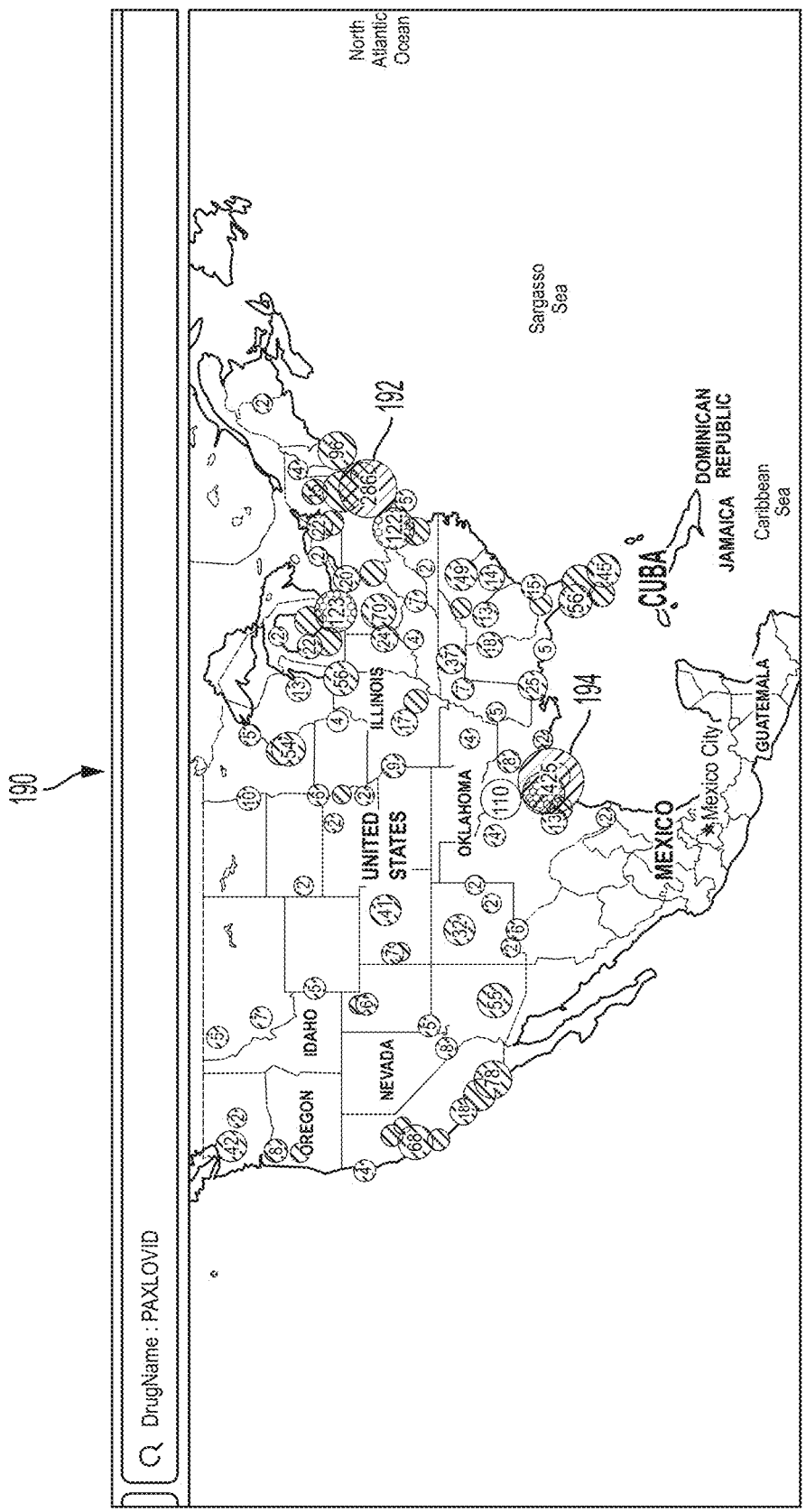
FIG. 19 is a diagram of an example of a geographic schematic of data gathered from container vault systems according to an embodiment.

FIG. 19 illustrates a geographic schematic 190 of data gathered from container vault systems, with each circle representing a container vault. The geographic schematic 190 can generally be implemented in conjunction with any of the embodiments described herein, for example the process 120 (FIG. 17) and/or PA architecture 170 (FIG. 18).

Medication dispensations (which are all associated with a same disease) from each container vault are denoted by the number (higher number means more medications dispensed from a respective container vault) and size (larger size symbolizes that more medications are dispensed form a respective container vault). As illustrated, the container vaults associated with areas 192 and 194 have a higher number of dispensed medications. The dispensations for medications for every disease can be similarly present in a graphical format.

Figure 20:
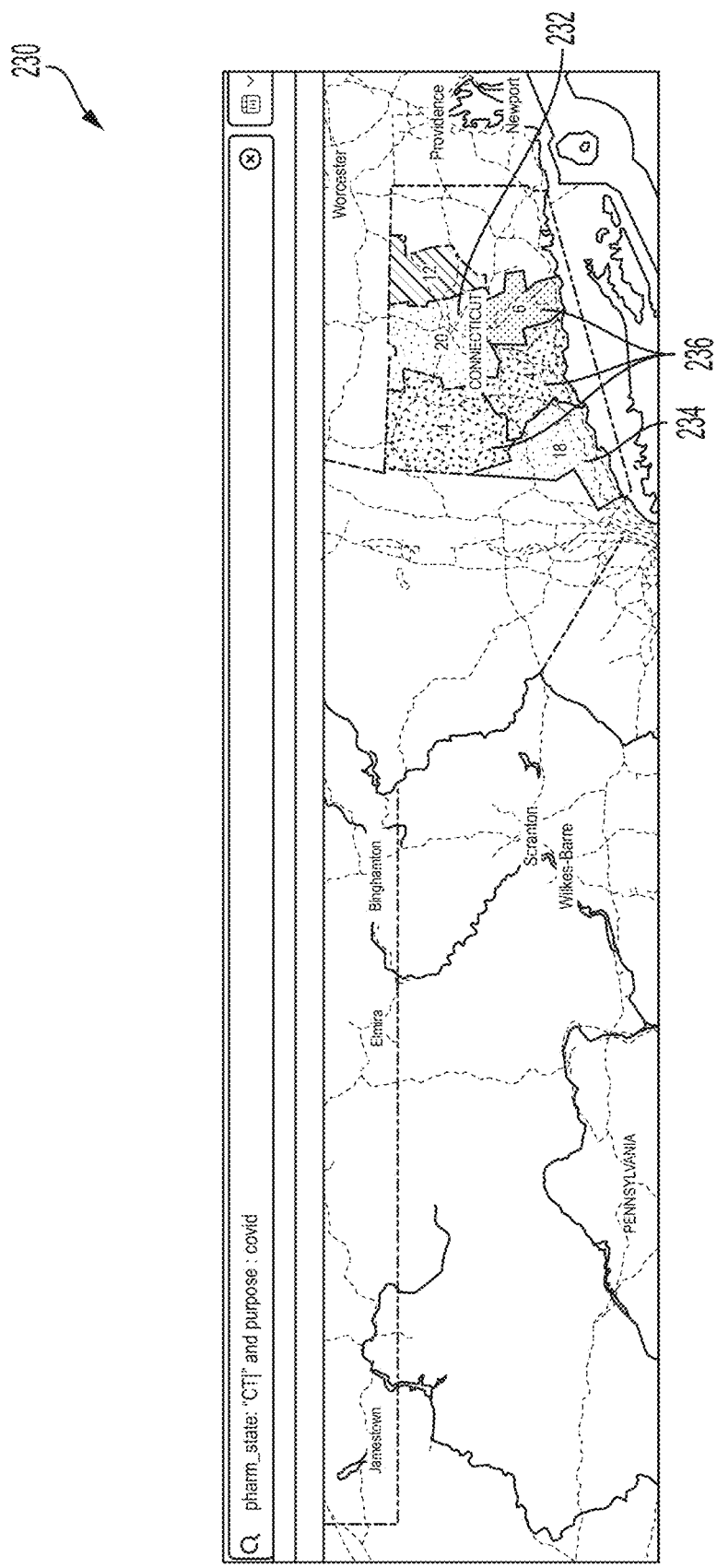
FIG. 20 is a diagram of an example of an aggregate view of data from different container vault systems according to an embodiment.

FIG. 20 illustrates an aggregate view 230 of data from different container vault systems for coronavirus disease spread in Connecticut. The aggregate view 230 can generally be implemented in conjunction with any of the embodiments described herein, for example the process 120 (FIG. 17), PA architecture 170 (FIG. 18) and/or geographic schematic 190 (FIG. 19). Geofences of the different container vaults are formed along county lines. The numbers within each geofence (geofences are contained within the lines) represent the medicines dispensed from the respective container vaults that treat coronavirus disease. Geofenced areas 232 and 234 have dispensed a large amount of medications related to coronavirus and are thus shown as hotspots. Thus, PA requests for coronavirus medicine that are associated with geofenced areas 232 and 234 are likely to be automatically analyzed for authorization or disapproval. Geofenced areas 236 have dispensed lower amounts of medications related to coronavirus. Thus, PA requests for coronavirus medicine that are associated with geofenced areas 236 are unlikely to be automatically analyzed for authorization or disapproval.

Figure 21:
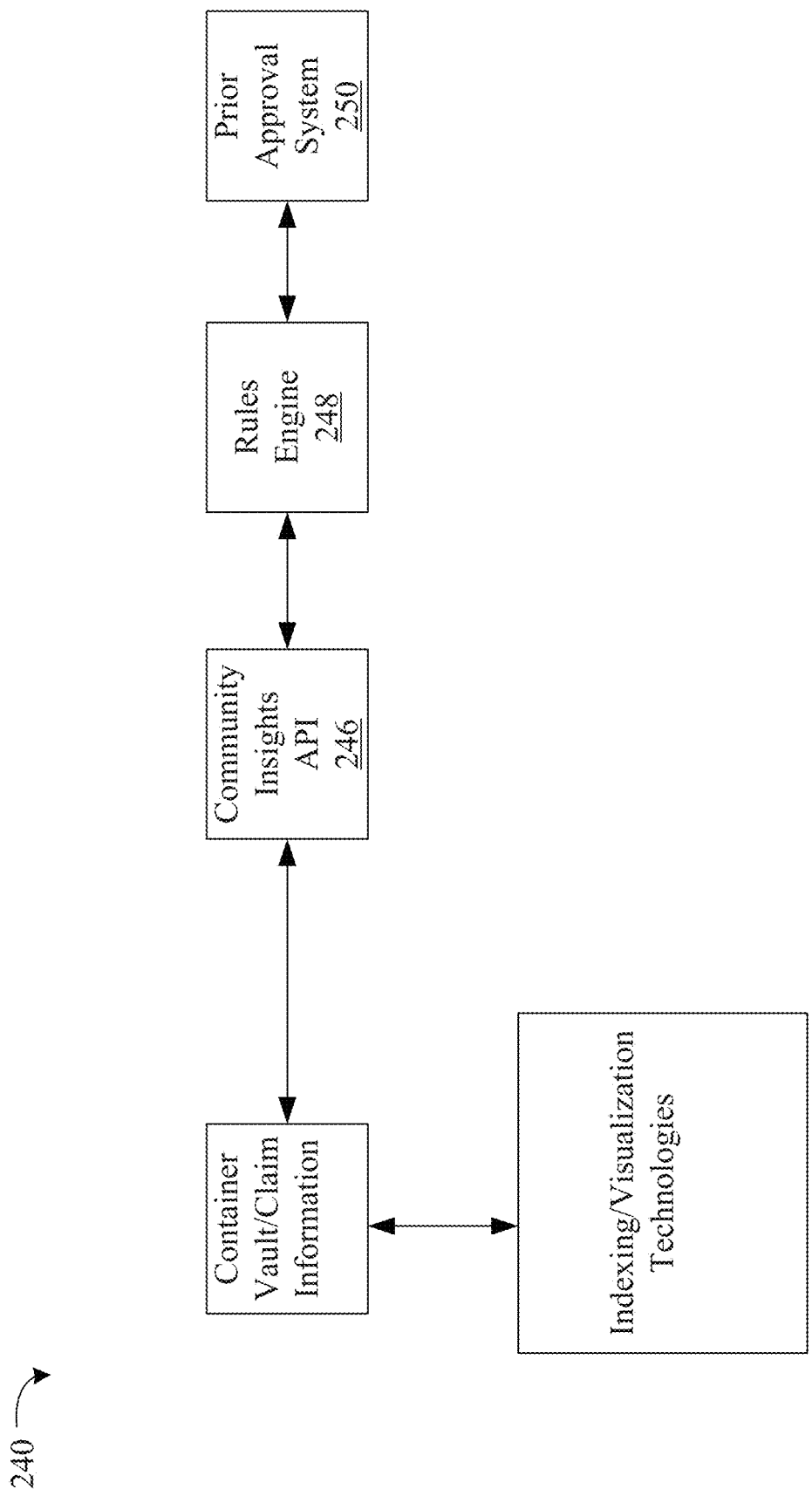
FIG. 21 is a diagram of an example of a prior authorization architecture according to an embodiment.

FIG. 21 illustrates a PA architecture 240 that includes a rules engine 248. The PA architecture 240 can generally be implemented in conjunction with any of the embodiments described herein, for example the process 120 (FIG. 17), PA architecture 170 (FIG. 18), geographic schematic 190 (FIG. 19) and/or aggregate view 230 (FIG. 20). The PA architecture 240 can be part of the container vault server 142 (FIG. 17), API 150 (FIG. 17) and the container vault system 168 (FIG. 18)

The rules engine 248 determines if a particular medication requested on a particular day is more than a predetermined threshold (for example 60%) of an average value of the daily requests based on the historical data. The rules engine 248 enables PA systems to make a container vault API call. The rules engine 248 can instruct the prior approval system 250 that once the drug is marked for treating a prevalence disease, always call the community insights API 246 and approve the drug if patient history reveals that there are no adverse effects from the content of the drug or the existing conditions and current medications don't prevent the patient from using the medication.

Figure 22:
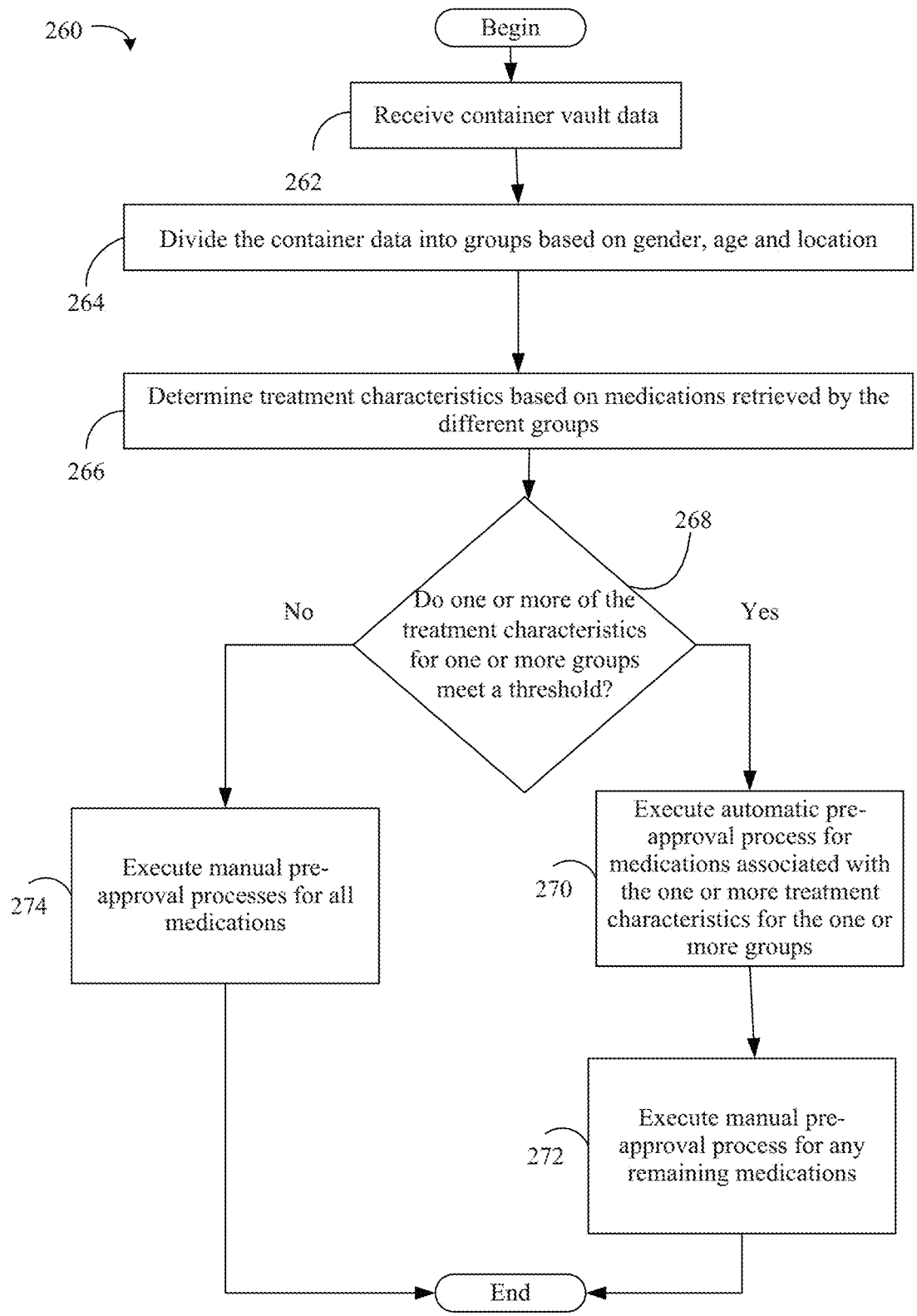
FIG. 22 is a flowchart of an example of a method of determining whether to execute an automated prior authorization process or a manual prior authorization process according to an embodiment.

FIG. 22 illustrates a method 260 of determining whether to execute an automatic pre-approval process based on treatment characteristics. The method 260 can generally be implemented in conjunction with any of the embodiments described herein, for example the process 120 (FIG. 17), PA architecture 170 (FIG. 18), geographic schematic 190 (FIG. 19), aggregate view 230 (FIG. 20) and/or PA architecture 240 (FIG. 21). In an embodiment, the method 260 is implemented in logic instructions (e.g., software), configurable logic, fixed-functionality hardware logic, computer readable instructions stored on at least one non-transitory computer readable storage medium that are executable to implement method 260, circuitry, etc., or any combination thereof.

Illustrated processing block 262 receives container vault data. Illustrated processing block 264 divides the container vault data into groups based on gender (e.g., gender of patients who receive medications), age (e.g., age of patients who receive medications) and location (e.g., group together data from within the same geofence). Illustrated processing block 266 determines treatment characteristics based on medications retrieved by the different groups. Illustrated processing block 268 determines if one or more of the treatment characteristics for one or more groups meet a threshold. If so, illustrated processing block 270 executes an automatic pre-approval process for medications associated with the one or more treatment characteristics for the one or more groups. For example, if a patient is part of the one or more groups (e.g., has an age that is included in the one or more groups) and has a prescription for one of the medications, the PA of the prescription can be executed with an API. In some examples, if the patient is not part of the one or more groups and has a prescription for one of the medications, a manual PA process can be executed to approve or disapprove of the prescription.

Illustrated processing block 272 execute manual pre-approval process for any remaining medications that are not approved or disapproved by processing block 270. If processing block 268 determines that one or more of the treatment characteristics for the one or more groups does not meet the threshold, illustrated processing block 274 executes manual pre-approval processes for all medications.

Figure 23:
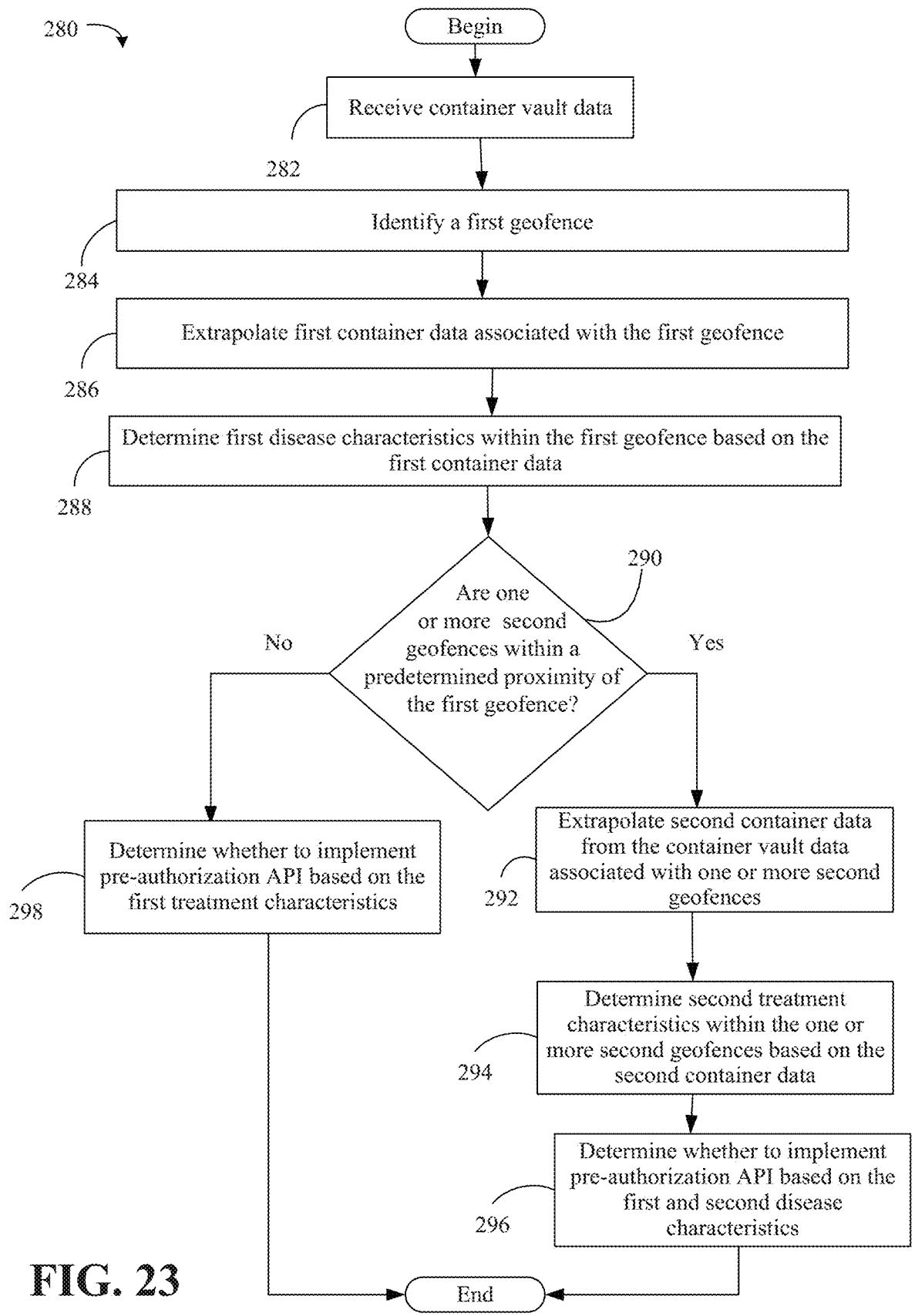
FIG. 23 is a flowchart of an example of a method of determining whether to incorporate data from bordering geofences when executing prior authorization processes according to an embodiment.

FIG. 23 illustrates a method 280 of determining whether to incorporate data from bordering geofences when executing PA processes. The method 280 can generally be implemented in conjunction with any of the embodiments described herein, for example the process 120 (FIG. 17), PA architecture 170 (FIG. 18), geographic schematic 190 (FIG. 19), aggregate view 230 (FIG. 20), PA architecture 240 (FIG. 21) and/or method 260 (FIG. 22). In an embodiment, the method 280 is implemented in logic instructions (e.g., software), configurable logic, fixed-functionality hardware logic, computer readable instructions stored on at least one non-transitory computer readable storage medium that are executable to implement method 260, circuitry, etc., or any combination thereof.

Illustrated processing block 282 receives container vault data. Illustrated processing block 284 identifies a first geofence. Illustrated processing block 286 extrapolates first container data associated with the first geofence. Illustrated processing block 288 determines first treatment characteristics within the first geofence based on the first container data. Illustrated processing block 290 determines if one or more second geofences are within a predetermined proximity of the first geofence. If so, illustrated processing block 292 extrapolates second container data from the container vault data associated with one or more second geofences. Illustrated processing block 294 determines second treatment characteristics within the one or more second geofences based on the second container data. Illustrated processing block 296 determines whether to implement a pre-authorization API based on the first and second treatment characteristics (if one or more of the first and second treatment characteristics meets a threshold). If processing block 290 determines that the one or more second geofences are not within a predetermined proximity of the first geofence, illustrated processing block 298 determines whether to implement the pre-authorization API based on the first treatment characteristics.

Figure 24:
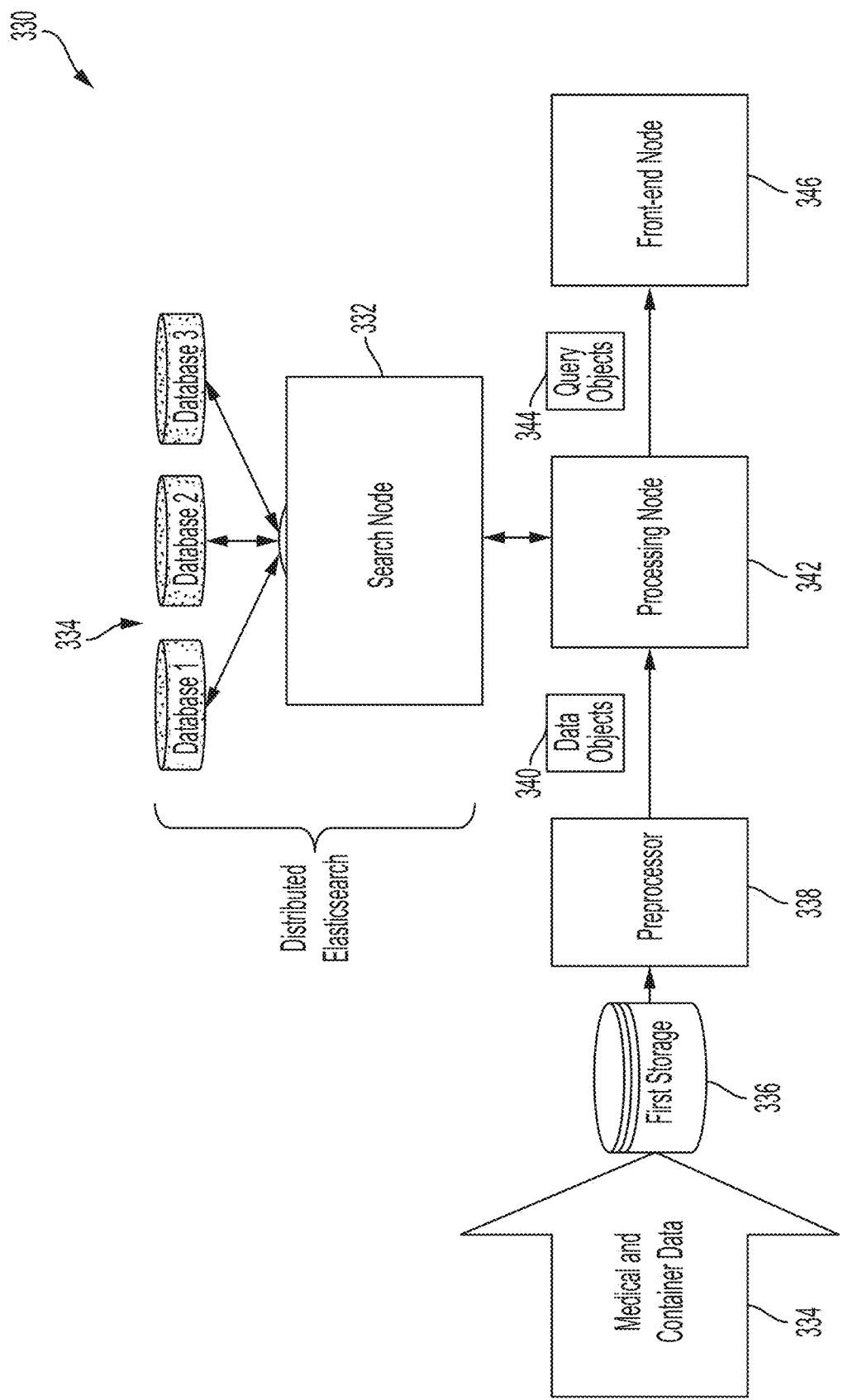
FIG. 24 is a diagram of an example of an indexed search architecture according to an embodiment.

FIG. 24 illustrates an indexed search architecture 330 (e.g., elastic search structure) to search patient data, geographic data, disease data, medication data, etc. Elastic search indexes the unformatted data from multiple sources generating the indexed search architecture 330. This will enable the system to identify prevalence of disease at any location. The indexed search architecture 330 can generally be implemented in conjunction with any of the embodiments described herein, for example the process 120 (FIG. 17), PA architecture 170 (FIG. 18), geographic schematic 190 (FIG. 19), aggregate view 230 (FIG. 20), PA architecture 240 (FIG. 21), method 260 (FIG. 22) and/or method 280 (FIG. 23). Examples can include a distributed and scalable full-text search engine.

FIG. 24 illustrates the framework for real-time analysis of large scale data based on indexed searching to efficiently and quickly search unstructured data. Initially, medical and container data 334 can be scraped from various sources discussed above (e.g., patient records, container vaults, county data, etc.). The medical and container data 334 can be transferred to and stored in first storage 336. Preprocessor 338 can standardize and modify the medical and container data 334 into a standard format. The preprocessor 338 can provide data objects 340 to a processing node 342 (e.g., a High Performance Computing node) in near real-time. A query can be sent to the search node 332 using a front-end node 346 (can be user accessible and receives user inputs) that outputs query objects 344 to the processing node 342 to execute a PA process. The search node 332 accesses data for a PA process (e.g., to identify medications dispensed in an area within a geofence). Elastic search indexes the unformatted data from multiple sources. Doing so will enable the system to identify prevalence of disease at any location.

Within the general functioning of the search engine, some examples use a running instance, referred to as the search node 332, which can take on one or more roles including a master or a data node). Dataset clusters within the indexed search architecture 330 can include at least one master and one data node (discussed further at FIG. 25 below), however it is possible that a cluster can include a single node since a node can take on multiple roles.

Indexed search architecture 330 uses an inverted index architecture to store the data. A typical index is a collection of documents with different properties that have been organized through user defined mapping that outlines document types and fields for different data sources; similar to a table in a Structured Query Language (SQL) database. The reverse index is then split into shards housed in multiple nodes or databases 1-3, where a shard is part of an index distributed on different nodes. Within the search node 332, the inverted index allows a more categorical storage of big data sets within nodes and shards so that real-time search queries are more efficient.

In some examples, the indexed search architecture 330 generates an index corresponding to medication data from container vaults, and subdivides the index into a plurality of partitions, where each of the partitions corresponds to a portion of the medication data. The indexed search architecture 330 stores the plurality of partitions and the portions of the medication data on a plurality of nodes (e.g., nodes storing databases 1-3), executes a search based on the plurality of partitions to retrieve parts (e.g., at least one object part pertaining to medication) of the portions of the medication data that are associated with the disease, and determines a treatment characteristic based on the retrieved parts. The at least one object part can be analyzed to determine whether to execute an automated process for medicine approval.

Figure 25:
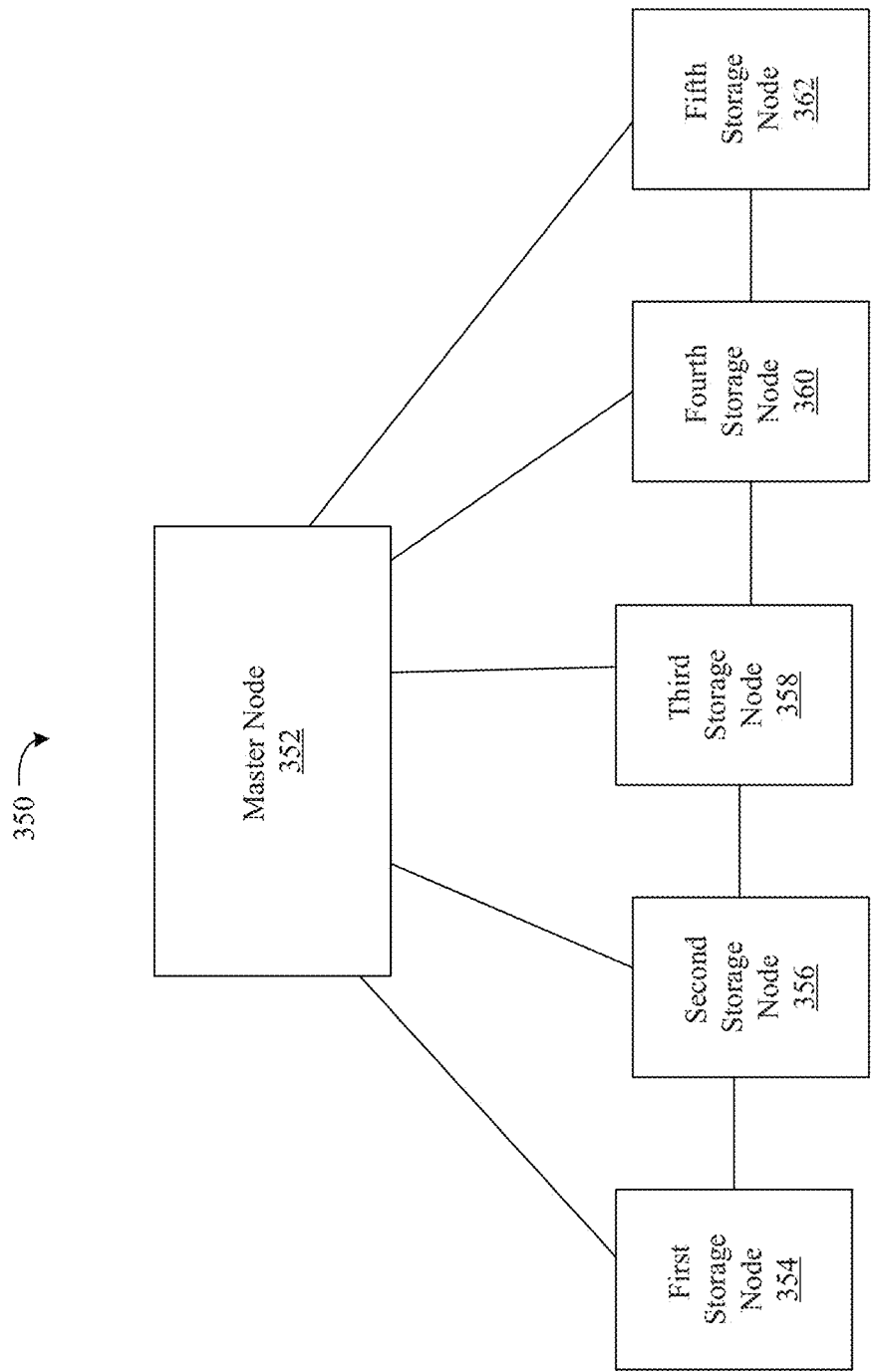
FIG. 25 is a diagram of an example of a block diagram of an architecture of the storage and search cluster according to an embodiment.

FIG. 25 illustrates a block diagram of an architecture of a storage and search cluster 350. The storage and search cluster 350 can generally be implemented in conjunction with any of the embodiments described herein, for example the process 120 (FIG. 17), PA architecture 170 (FIG. 18), geographic schematic 190 (FIG. 19), aggregate view 230 (FIG. 20), PA architecture 240 (FIG. 21), method 260 (FIG. 22), method 280 (FIG. 23), and/or an indexed search architecture 330 (FIG. 24). The elastic cluster 350 includes a master node 352 that can access first storage node 354, second storage node 356, third storage node 358, fourth storage node 360 and fifth storage node 362 to retrieve data. The first storage node 354, second storage node 356, third storage node 358, fourth storage node 360 and fifth storage node 362 can store shards of data that is quickly retrievable by the master node 352.

A node is a single server that is a part of a cluster. A node stores data and participates in the cluster's indexing and search capabilities. A search node can be configured in different ways, such as master node, data node and/or client node. The master node is responsible for all cluster-wide operations like creating/deleting an index and adding/removing nodes. The data node stores data and executes data-related operations such as search and aggregation. A client node forwards cluster requests to the master node and data-related requests to data nodes.

Examples subdivide the index into multiple pieces called shards. Each shard is in itself a fully-functional and independent "index" that can be hosted on any node within a cluster. By distributing the documents in an index across multiple shards, and distributing those shards across multiple nodes, examples can ensure redundancy, which both protects against hardware failures and increases query capacity as nodes are added to a cluster.

Container Vault Examples

Conventional methods can have several drawbacks relating to transporting medication packages to consumers. For example, both standard and temperature-controlled shipping packages do not provide any meaningful security features to guard against theft or receipt of the medication packages by impersonating identities. This can result in fraud and potential prescription drug abuse by unauthorized users. Also, while coolers and other temperature-controlled shipping packages provide a certain level of temperature protection, they can be insufficient to protect high end specialty drugs that have specific environmental storage requirements. This issue is particularly problematic when shipping packages sit outside in extreme weather conditions. Thus, there remains a need in the art for a technological solution that offers features, functionality or other advantages not provided by existing packaging solutions.

The present disclosure is directed to a container vault system for controlling access to medication packages and preferably storing the medication packages under desired environmental conditions. While the examples will be described in detail below with reference to various exemplary embodiments, it should be understood that the examples are not limited to the specific configurations or methods of any of these embodiments. In addition, although the exemplary embodiments are described as embodying several different inventive features, those skilled in the art will appreciate that any one of these features could be implemented without the others in accordance with the examples.

In the present disclosure, references to "one embodiment," "an embodiment," "an exemplary embodiment," or "embodiments" mean that the feature or features being described are included in at least one embodiment of the examples. Separate references to "one embodiment," "an embodiment," "an exemplary embodiment," or "embodiments" in this disclosure do not necessarily refer to the same embodiment and are also not mutually exclusive unless so stated and/or except as will be readily apparent to one skilled in the art from the description. For example, a feature, structure, function, etc. described in one embodiment can also be included in other embodiments, but is not necessarily included. Thus, the present examples can include a variety of combinations and/or integrations of the embodiments described herein.

System Configuration

Referring to FIG. 1, a container vault system in accordance with one example is shown generally as reference number 100. System 100 includes a central server 102 that communicates with a plurality of network elements—i.e., a plurality of container vaults $104_1$-$104_n$, a plurality of computing devices $106_1$-$106_n$, and a plurality of healthcare provider servers $108_1$-$108_n$—via a communication network 110.

Network 110 can comprise any network or combination of networks capable of facilitating the exchange of data among the network elements of system 100. In some embodiments, network 110 enables communication in accordance with one or more cellular standards, such as the Long-Term Evolution (LTE) standard, the Universal Mobile Telecommunications System (UMTS) standard, and the like. In other embodiments, network 110 enables communication in accordance with the IEEE 802.3 protocol (e.g., Ethernet) and/or the IEEE 802.11 protocol (e.g., Wi-Fi). Of course, other types of networks can also be used within the scope of the examples herein.

Central Server

Figure 2:
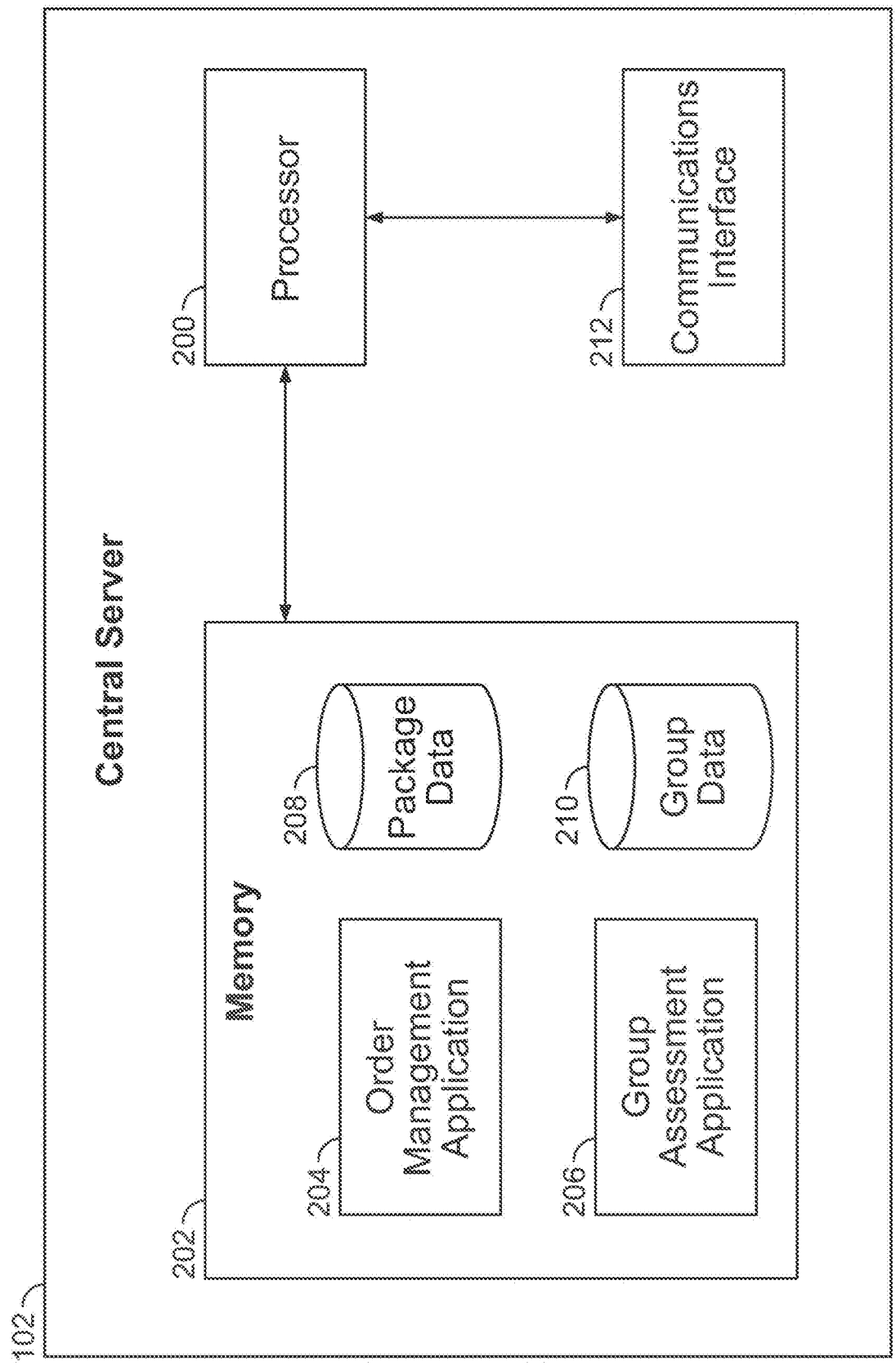
FIG. 2 is a block diagram of the central server shown in FIG. 1.

FIG. 2 is a block diagram illustrating an exemplary embodiment of central server 102 that can be used within system 100. Central server 102 includes a processor 200 that is operatively connected to various hardware and software components, which together enable central server 102 to perform the methods described herein. Processor 200 can comprise a multi-core processor, multiple processors, or some other type of processor, depending on the particular implementation. Processor 200 is operatively connected to a memory 202, which can be fixed or removable. Memory 202 can include any suitable combination of volatile memory (e.g., random-access memory (RAM)) and non-volatile memory (e.g. read-only memory (ROM), electrically erasable programmable read-only memory (EEPROM), or flash memory). Memory 202 stores one or more software programs or applications, such as an order management application 204 and a container group assessment application 206, as well as one or more databases, such as a medication package database 208 and a container group database 210, as described below.

Order management application 204 includes one or more software modules each of which comprises instructions that, when executed by processor 200, cause processor 200 to perform certain methods described herein relating to the receipt of orders, creation of package data for each medication package, and transport of medication packages to container vaults $104_1$-$104_n$ (described below with reference to FIG. 9). Medication package database 208 contains package data for the medication packages transported to container vaults $104_1$-$104_n$. The package data for each medication package can be stored in association with a globally unique identifier (GUID) for the container vault compartment in which the medication package is stored while waiting for retrieval by a consumer or other authorized user. In this embodiment, the package data generally includes (1) configuration data that identifies at least one environmental property setting to be used for storage of the medication package and (2) user access data that identifies at least one authorized user permitted to retrieve the medication package.

For example, the package data can include any combination of the following information: the destination container vault; the physical location of the container vault; the desired environmental properties for storage of the medication package (e.g., temperature level, humidity level, light level, pressure level, or ventilation level); the sender of the medication package (e.g., a pharmaceutical fulfillment system); a list of transporters for the medication package (e.g., a logistics company); the intended recipient of the medication package (e.g., a consumer/patient); a list of collectors authorized to retrieve the medication package (e.g., a family member, caretaker, or other authorized user); a medication package value; a list of medication package category tags; the time that the mediation package is placed in the container vault; the time that the medication package is retrieved from the container vault; and a status of the medication package. Of course, other types of package data can also be stored in accordance with the examples described herein.

Container group assessment application 206 includes one or more software modules each of which comprises instructions that, when executed by processor 200, cause processor 200 to perform certain methods described herein relating to the assessment and tracking of group characteristics for various groups of container vaults $104_1$-$104_n$ (described below with reference to FIG. 11). Container group database 210 contains group data that generally includes a group characteristic for each container group. The group characteristic can comprise, for example, a medical condition associated with the container group or a medical supply needed for the container group. Of course, other types of group characteristics can also be stored in accordance with examples herein.

Central server 102 further includes a communications interface 212 that is operatively connected to processor 200. Communications interface 212 can be any interface that enables communication between central server 102 and other network elements (including container vaults $104_1$-$104_n$, computing devices $106_1$-$106_n$, and healthcare provide servers $108_1$-$108_n$) via network 110. In some embodiments, the communications interface 212 comprises a network interface card (NIC), an integrated network interface, and/or any other interfaces for connecting central server 102 to other network elements and/or communication networks. Such connections can include a wired connection or a wireless connection.

In the embodiment shown in FIG. 1, central server 102 is used to store order management application 204, container group assessment application 206, medication package database 208, and container group database 210. Of course, other embodiments can include additional servers for performing some of these methods, which can be co-located in the same geographic location or located in different geographic locations and connected to each other via network 110. For example, all or a portion of the various modules of order management application 204 and/or container group assessment application 206 could be stored on one or more application servers that can be accessed via network 110. Further, all or a portion of the data contained in medication package database 208 and/or container group database 210 could be stored on one or more database servers that can be accessed via network 110. Thus, the system can be implemented with any number and combination of servers that are either co-located or geographically dispersed.

Container Vaults

Figure 3:
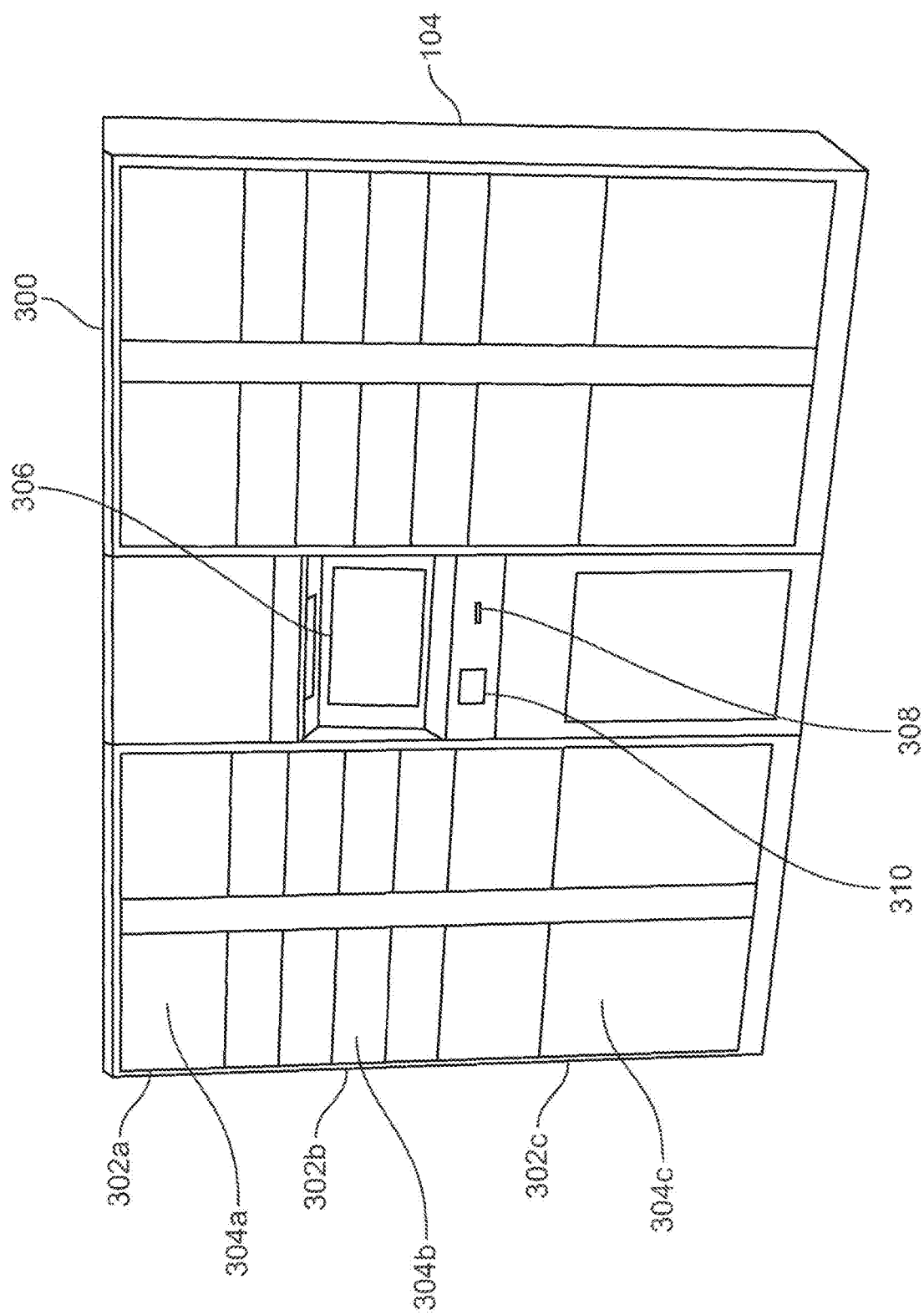
FIG. 3 is a front perspective view of an exemplary container vault that can be used as one of the container vaults shown in FIG. 1.

FIG. 3 illustrates an exemplary embodiment of a container vault 104 that can be used as one of container vaults $104_1$-$104_n$ shown in FIG. 1. Container vault 104 comprises a locker-type facility that can be located within a pharmacy or other retail store. Container vault 104 includes a vault housing 300 that defines a plurality of vault compartments, including vault compartment 302a, vault compartment 302b, and vault compartment 302c. In this embodiment, container vault 104 includes twenty-nine vault compartments—i.e., sixteen small-sized vault compartment (such as vault compartment 302b), eight medium-sized vault compartments (such as vault compartment 302a), and five large-sized vault compartments (such as vault compartment 302c). Of course, a container vault can include any number and size of vault compartments in accordance with the examples herein. Each of the vault compartments is assigned a globally unique identifier (GUID) that can be associated with package data for a medication package assigned to that vault compartment, as described below.

Figure 4:
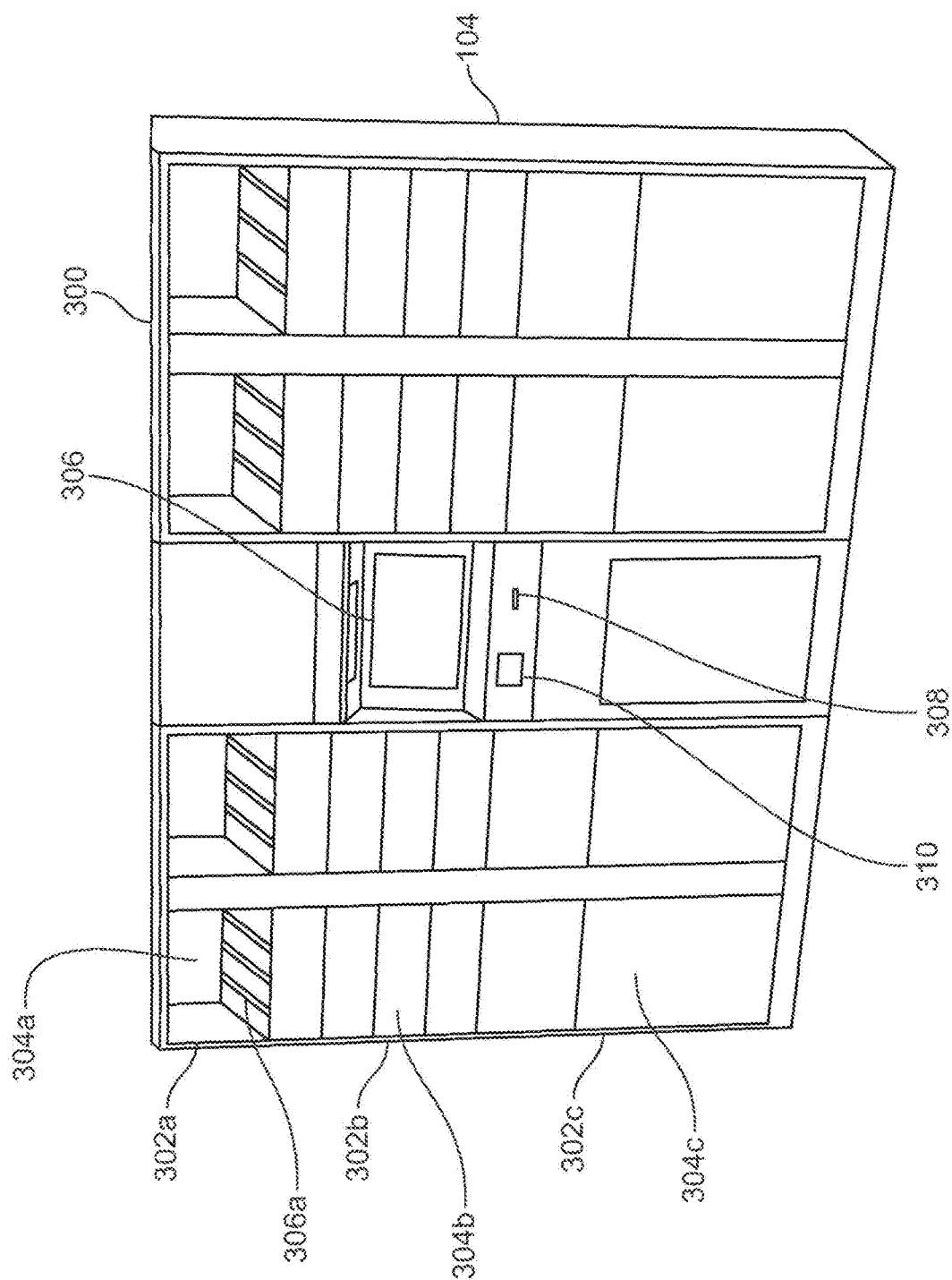
FIG. 4 is a front perspective view of the container vault shown in FIG. 3 with the top doors and containers removed to show the magnetic induction rails on the floor of each compartment of the vault housing.

Each of the vault compartments is configured to house a removable container behind a locked door, such as doors 304a, 304b, 304c of vault compartments 302a, 302b, 302c, respectively. FIG. 4 shows container vault 104 without the doors on the top row of vault compartments (and without placement of the containers therein) to illustrate the interior structure of the vault compartments. As can be seen, the floor of each of the vault compartments includes magnetic induction rails, such as magnetic induction rails 306a of vault compartment 302a. It will be seen that the magnetic induction rails are used to wirelessly charge a rechargeable battery of the container housed in the vault compartment.

Figure 5:
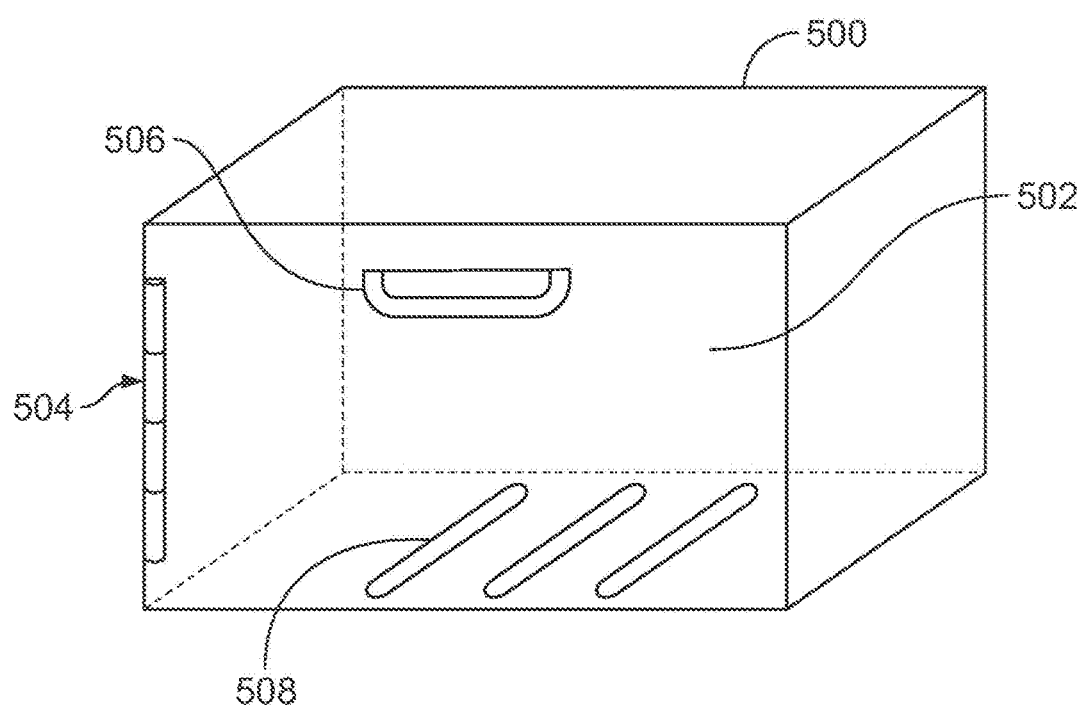
FIG. 5 is a front perspective view of an exemplary container that can be placed in a compartment of the vault housing shown in FIGS. 3 and 4.

FIG. 5 illustrates an exemplary embodiment of a container 500 that can be housed within one of the vault compartments of container vault 104. As can be seen, container 500 comprises a generally box-like structure that is configured to hold a medication package transported from a pharmaceutical fulfillment system. Container 500 includes a door 502 that can be pivotally moved about a hinge 504 between an open position and a closed position. A handle 506 is provided on the exterior of door 502 for use in sliding container 500 out of its vault compartment. The bottom of container 500 includes charging contacts 508 that cooperate with the magnetic induction rails of the vault compartment (see FIG. 4) to wirelessly charge a rechargeable battery of container 500, as discussed below.

Figure 6:
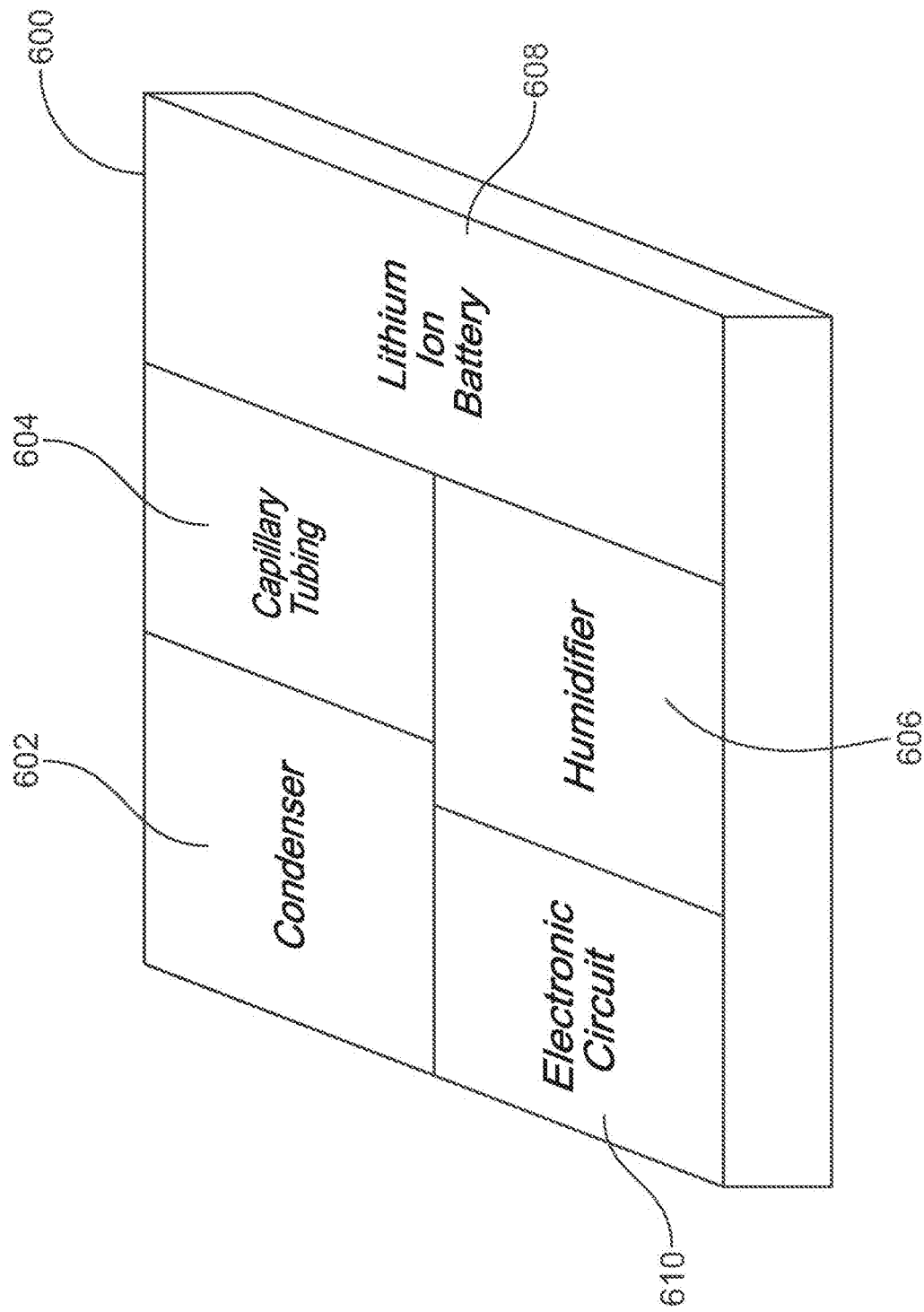
FIG. 6 is a block diagram of the flooring section of the container shown in FIG. 5.

As shown in FIG. 6, container 500 includes a flooring section 600 that is positioned over charging contacts 508 on the bottom of container 500 (note that flooring section 600 is not shown in FIG. 5 to better illustrate charging contacts 508). Flooring section 600 includes one or more components that are configured to change an environmental property (e.g., temperature level, humidity level, light level, pressure level, and/or ventilation level) within container 500. In this embodiment, flooring section 600 includes the following components: a condenser 602 with evaporator coils that extract heat from the interior of container 500 to the outside of container vault 104 so as decrease the temperature within container 500; capillary tubing 604 that meters the refrigerant in the evaporator coils so as to adjust the temperature within container 500; and a humidifier unit 606 configured to adjust the humidity within container 500. Of course, flooring section 600 can include other components that are configured to change different environmental properties in accordance with examples herein.

Flooring section 600 also includes a rechargeable battery 608 that is configured to provide power to the various components of flooring section 600. In this embodiment, rechargeable battery 608 comprises a lithium-ion rechargeable battery with contacts positioned to contact charging contacts 508 on the bottom of container 500. As discussed above, charging contacts 508 cooperate with the magnetic induction rails of the vault compartment (see FIG. 4) to wirelessly charge rechargeable battery 608.

Figure 7:
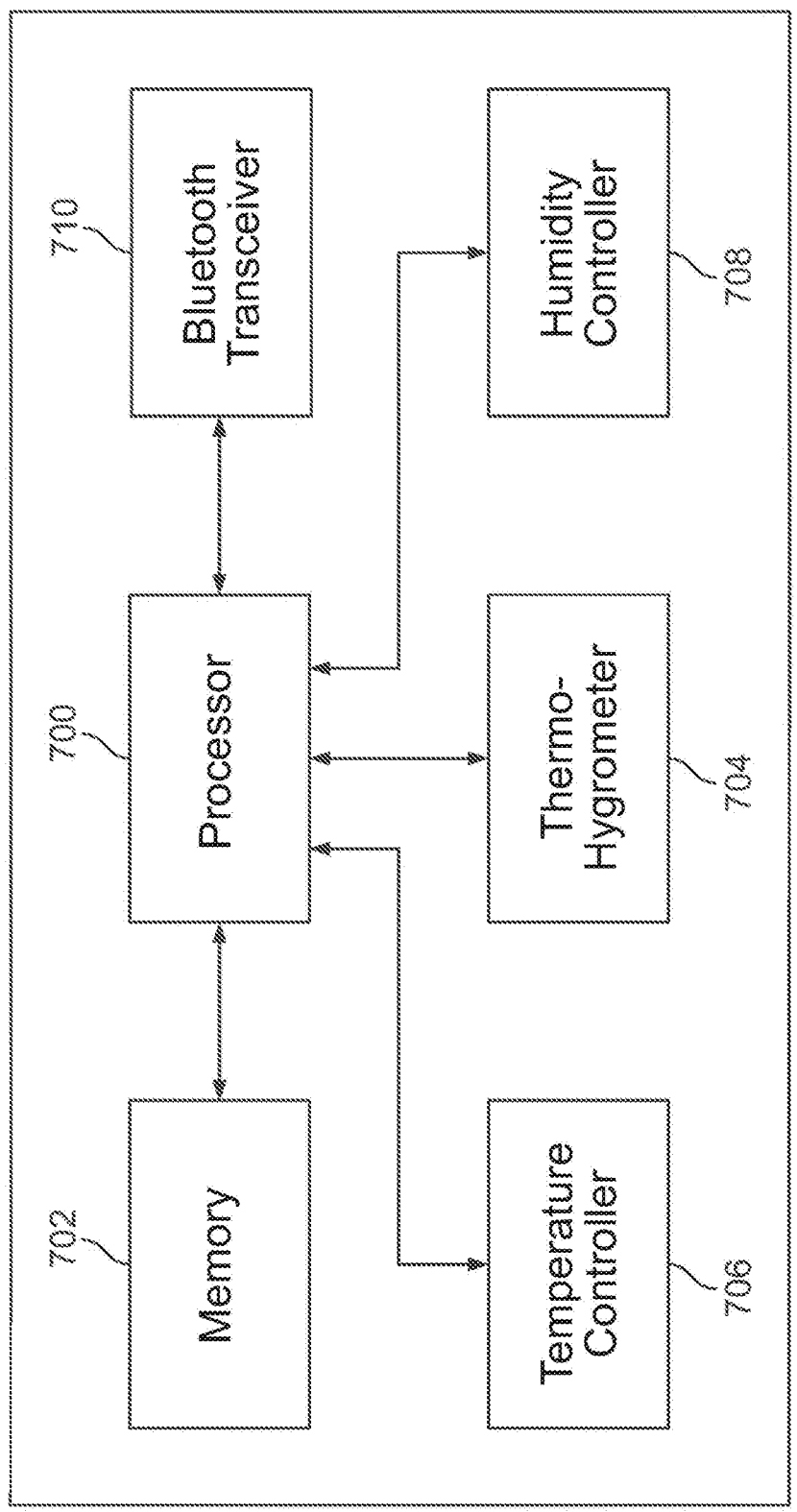
FIG. 7 is a block diagram of the electronic circuit incorporated into the flooring section shown in FIG. 6.

Flooring section 600 also includes an electronic circuit 610. FIG. 7 is a block diagram illustrating an exemplary embodiment of electronic circuit 610, which includes an onboard processor 700 that is operatively connected to a memory 702 and the following components: a thermo-hygrometer 704 configured to measure the temperature and humidity within container 500; a temperature controller 706 configured to control condenser 602 and capillary tubing 604 so as to adjust the temperature level within container 500; a humidity controller 708 configured to control humidifier unit 606 so as to adjust the humidity level within container 500; and a Bluetooth transceiver 710 configured to enable communication with the control system of container vault 104 in accordance with the IEEE 802.15.1 protocol. Of course, other types of communication interfaces can also be used in accordance with examples herein.

Memory 702 stores firmware execution code instructions that, when executed by processor 700, cause processor 700 to perform the steps required to maintain a desired temperature level and a desired humidity level within container 500. Specifically, processor 700 receives a temperature setting and a humidity setting to be used for storage of a medication package in container 500. In this embodiment, the settings are received from the control system of container vault 104 via Bluetooth transceiver 710, as described in greater detail below. Processor 700 receives periodic temperature and humidity measurements from thermo-hygrometer 704. If a temperature measurement is not equal to the received temperature setting, then processor 700 sends instructions to temperature controller 706 to adjust the temperature level within container 500 via control of condenser 602 and capillary tubing 604. Similarly, if a humidity measurement is not equal to the received humidity setting, then processor 700 sends instructions to humidity controller 708 to adjust the humidity level within container 500 via control of humidifier unit 606.

Referring back to FIG. 3, container vault 104 also includes one or more input devices that enable an authorized user to input the access credentials required to retrieve a medication package from one of the vault compartments. An authorized user can be the intended recipient of the medication package (e.g., a patient/consumer) or an individual who the intended recipient has authorized to retrieve the medication package (e.g., a family member or caretaker), as designated on a list of collectors. In some embodiments, the intended recipient is able to update the list of collectors via a user profile maintained on central server 102 or another server managed by the pharmaceutical fulfillment system.

In this embodiment, the input devices comprise a touchscreen display 306, a card reader 308, and a barcode scanner 310. Touchscreen display 306 is configured to provide a graphical user interface that enables a user to enter a personal identification number (PIN), e.g., a randomized PIN that is sent to the intended recipient via email or text message. Card reader 308 is configured to read a medical/insurance card, and barcode scanner 310 is configured to scan a barcode provided on a government issued identification card (e.g., a driver's license) or any other type of identification card with a barcode. Of course, other types of input devices can also be used in accordance with examples herein, such as a physical keypad or biometric reader.

In some embodiments, an authorized user can use any one of the input devices to input the access credentials required to retrieve a medication package from one of the vault compartments. In other embodiments, a secondary factor of security is required, e.g., an individual must possess a card that is read by either card reader 308 or barcode scanner 310 and enter a PIN into touchscreen display 306. Of course, other authentication methods can also be used in accordance with examples herein.

Figure 8:
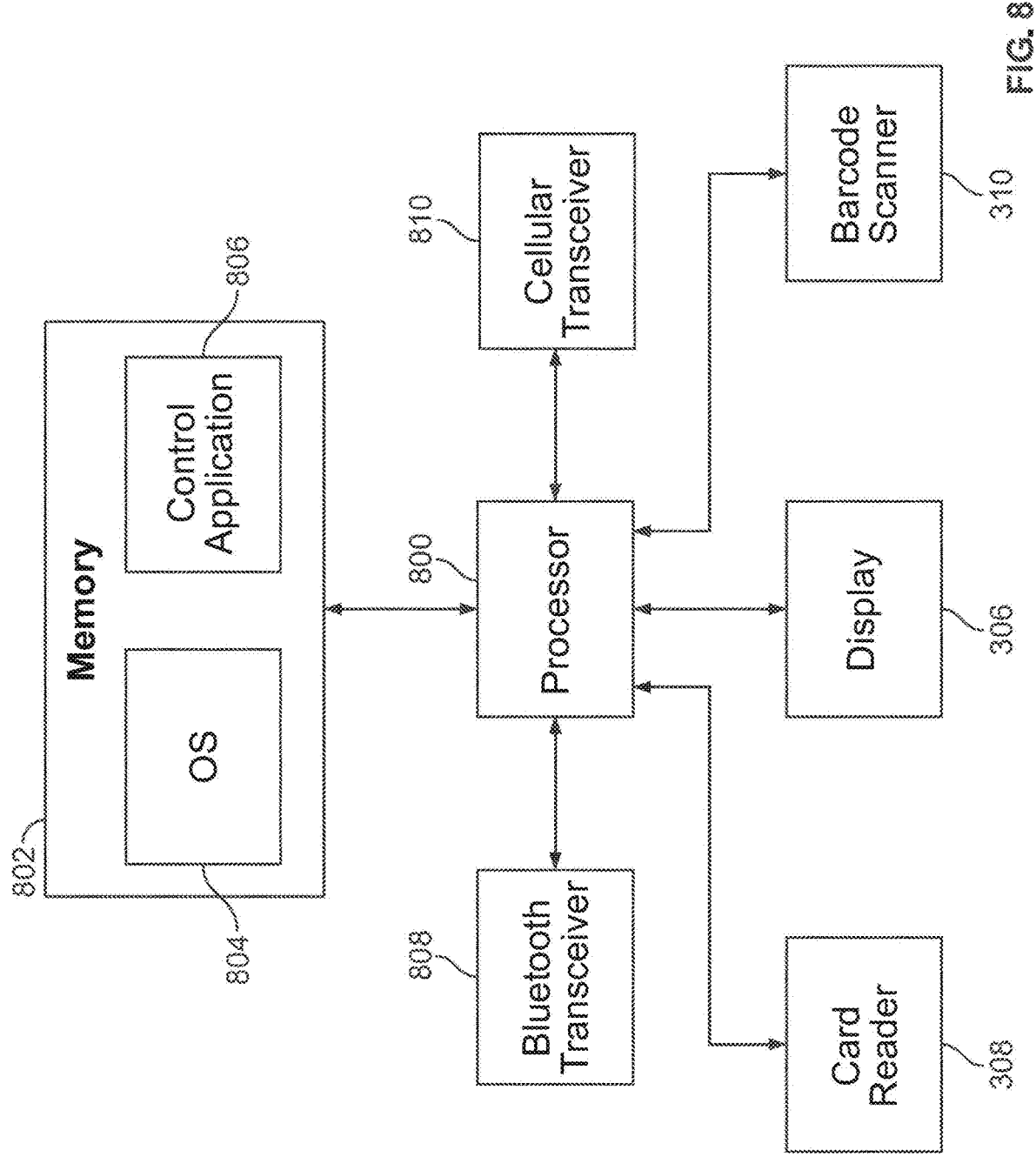
FIG. 8 is a block diagram of the control system of the container vault shown in FIGS. 3 and 4.

Container vault 102 further includes a control system that includes the input devices described above. FIG. 8 is a block diagram illustrating an exemplary embodiment of the control system that can be used within container vault 102. The control system includes a processor 800 that can comprise a central processing unit (CPU), a multi-core processor, multiple processors, or some other type of processor, depending on the particular implementation. Processor 800 is operatively connected to memory 802, which can comprise any suitable combination of volatile memory (e.g., random-access memory (RAM)) and non-volatile memory (e.g. read-only memory (ROM), electrically erasable programmable read-only memory (EEPROM), or flash memory). Memory 802 stores an operating system 804 and a control application 806.

Control application 806 refers generally to an application that enables communication with central server 102 and each container of container vault 102. Control application 806 comprises instructions that, when executed by processor 800, cause processor 800 and the various hardware components of the control system to (1) control access to each container so that only authorized users are permitted to retrieve the medication package from the container and (2) control the environmental components within each container so as to achieve desired environmental property settings for storage of a medication package within the container (as described below in connection with FIGS. 10A and 10B).

Processor 800 is also operatively connected to a Bluetooth transceiver 808 that enables short-range communication with each of the containers of container vault 102 in accordance with the IEEE 802.15.1 protocol. Of course, other types of short-range communication interfaces can also be used in accordance with examples herein.

Processor 800 is further operatively connected to cellular transceiver 810 that enables long-range communication with central server 102 and computing devices $106_1$-$106_n$ in accordance with a cellular protocol, such as those that operate using the Long-Term Evolution (LTE) standard, the Universal Mobile Telecommunications System (UMTS) standard, and the like. Alternatively, in some embodiments, processor 800 connects to a local network through a wireless connection (e.g., Wi-Fi) or a hard-wired connection (e.g., Ethernet), which in turn enables communication with central server 102 and computing devices $106_1$-$106_n$. Of course, other types of long-range communication interfaces can also be used in accordance with examples herein.

Computing Devices

Referring back to FIG. 1, container vaults $104_1$-$104_n$ can transmit notifications to the computing devices $106_1$-$106_n$ of the users who are authorized to retrieve medication packages from container vaults $104_1$-$104_n$ (e.g., the intended recipient and/or individuals on the collector list for each medication package). Examples of computing devices $106_1$-$106_n$ include a smartphone, a personal computing tablet, a smart watch, a personal computer, a laptop computer, or any other computing device that is capable of communication with central server system 102 via network 110. The notifications transmitted from container vaults $104_1$-$104_n$ to computing devices $106_1$-$106_n$ will be described below in connection with FIGS. 10A and 10B.

Servers of Healthcare Providers

Referring still to FIG. 1, central server 102 can transmit notifications to servers $108_1$-$108_n$ of the healthcare providers located in the communities in which container vaults $104_1$-$104_n$ are located. In some embodiments, each of servers $108_1$-$108_n$ broadcasts the notifications to clinicians associated with the healthcare provider. Of course, central server 102 could also transmit the notifications directly to the clinicians. The notifications transmitted from central server 102 to servers $108_1$-$108_n$ will be described below in connection with FIG. 11.

Methods/Software Functionality

The description of container vault system 100 provided above references various methods (i.e., software functionality) that are performed by central server 102 and container vaults $104_1$-$104_n$. These methods will now be described with reference to FIG. 9 (order management process performed by central server 102), FIGS. 10A-10B (control process performed by the control system of container vaults $104_1$-$104_n$), and FIG. 11 (container group assessment process performed by central server 102).

Order Management Process (Central Server)

Figure 9:
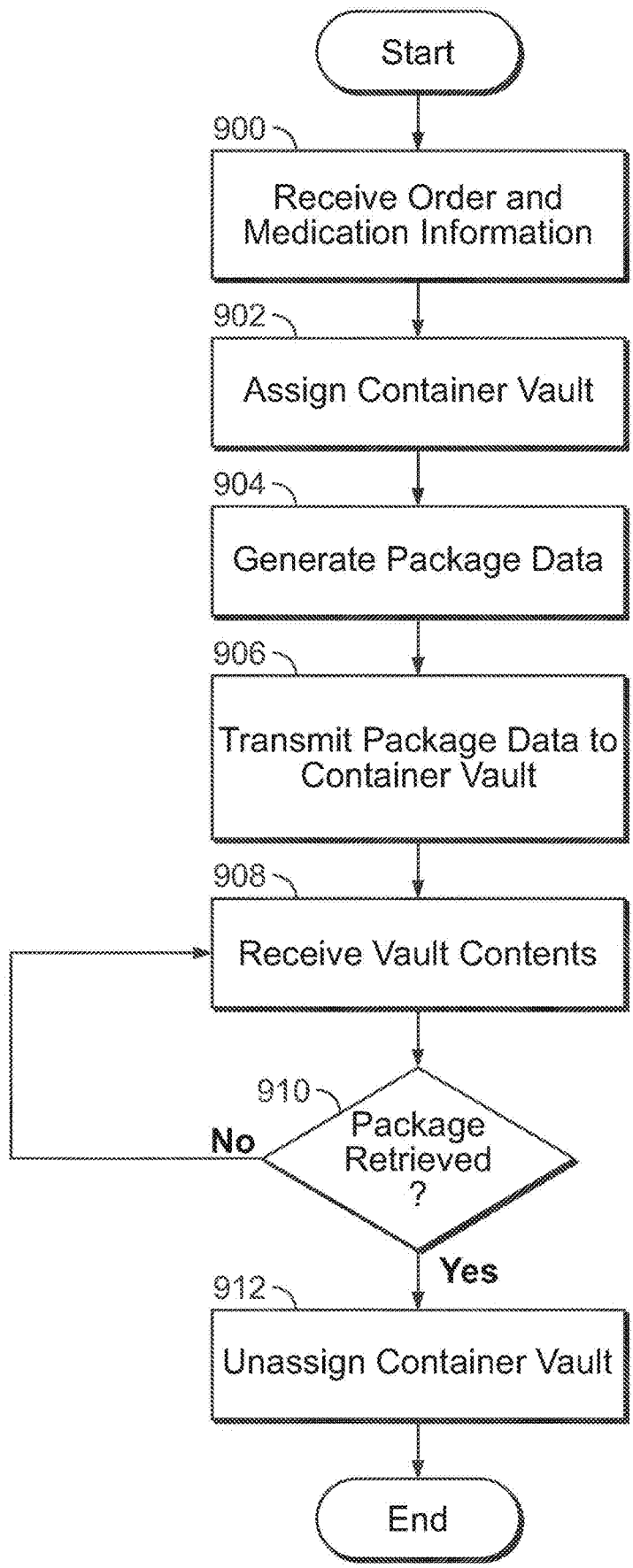
FIG. 9 is a process flow diagram of an exemplary method of managing the order and transport of a medication package as performed by the central server shown in FIG. 1.

Referring to FIG. 9, an order management process performed by central server 102 in accordance with one example is described with reference to steps 900-912.

In step 900, central server 102 receives an order for a prescription medication. In this embodiment, a consumer orders and requests delivery of the medication using a conventional online interface and, as part of this process, selects a convenient vault location for pickup of the medication. The consumer can also identify one or more users who are authorized to retrieve the medication package on behalf of the consumer. These users are referred to as "collectors" and are added to a list of collectors. It can be appreciated that certain package data is captured during this step, such as the destination container vault, the physical location of the container vault, the intended recipient of the medication package (i.e., the consumer), and the list of collectors.

A pharmacist who is tasked with filling the prescription then places the prescribed medication in a container, which is then placed in a package for transport to the selected vault location. The pharmacist can also use a software application or online interface to provide information associated with the medication package. It can be appreciated that certain package data is captured during this step, such as the desired environmental properties for storage of the medication package (e.g., temperature level, humidity level, light level, pressure level, or ventilation level), the sender of the medication package (i.e., the pharmaceutical fulfillment system), the medication package value, and the list of medication package category tags. The list of transporters for the medication package can also be provided by the sender, or can alternatively be provided directly by the transporters tasked with delivering the medication package to the selected vault location.

In step 902, central server 102 identifies an available vault compartment at the selected vault location and assigns the GUID of the vault compartment to the medication package. In step 904, central server 102 generates package data for the medication package and stores the package data in association with the assigned GUID within medication package database 208. In step 906, central server 102 transmits the package data along with the assigned GUID to the appropriate container vault. The steps performed by the container vault will be described below in connection with FIGS. 10A and 10B.

In step 908, central server 102 receives periodic messages from the control system of the container vault with information relating to the contents of the vault, including updated package data for the medication package stored in the vault compartment having the assigned GUID. Central server then updates the package data stored in medication package database 208 with the updated information. In step 910, central server 102 determines if the medication package has been retrieved from the container vault. If not, then the process returns to step 908. However, if the medication package has been retrieved from the container vault, then the GUID is marked as unassigned in step 912 so that the GUID is available for assignment to another medication package.

Of course, it should be understood that steps 900-912 are performed for each of different medication packages transported to different container vaults in order to fulfill different orders for prescription medications.

Control Process (Control System of Container Vault)

Figure 10A:
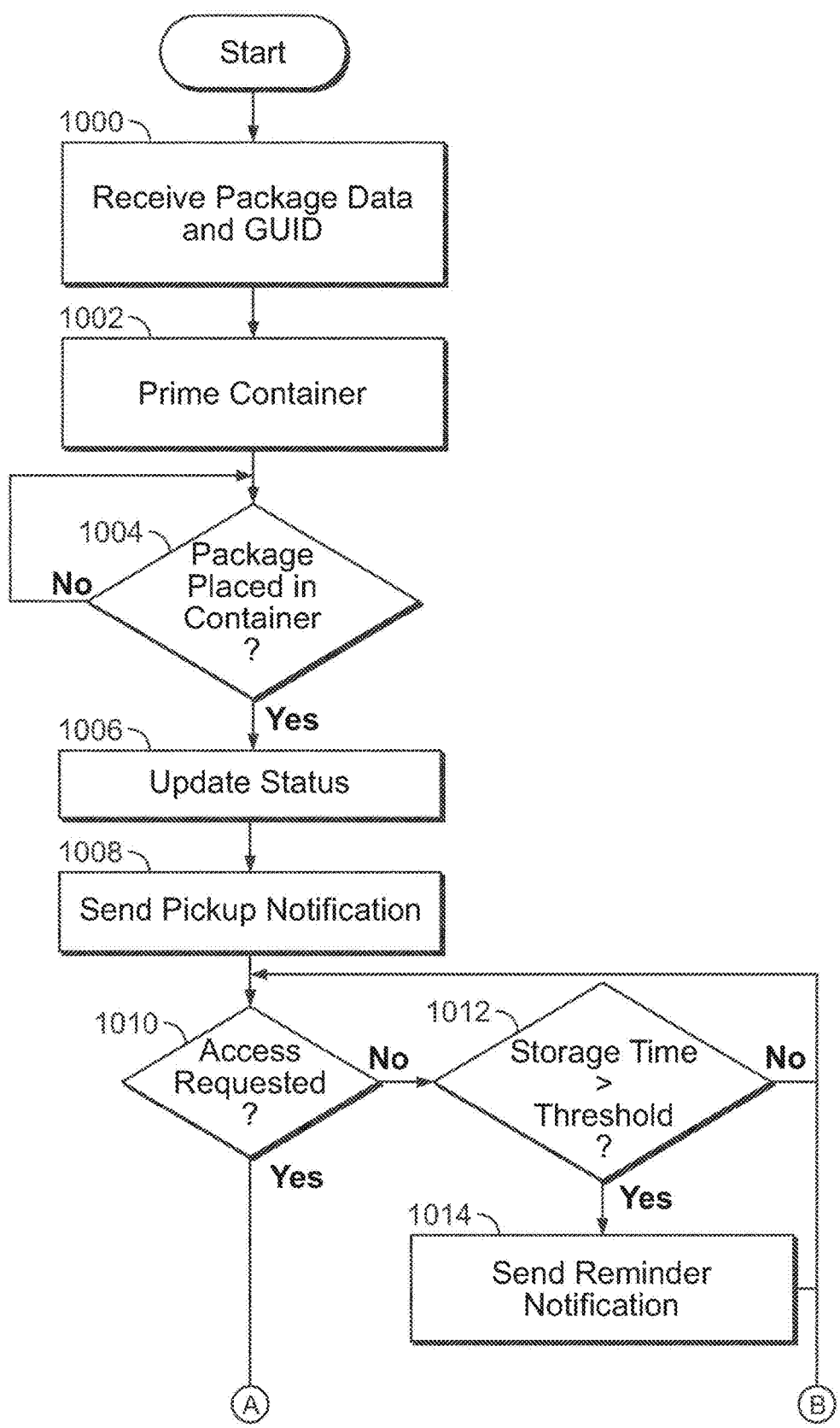
FIGS. 10A and 10B are process flow diagrams of an exemplary method of managing the intake, storage and retrieval of a medication package as performed by the container vault shown in FIG. 1.
Figure 10B:
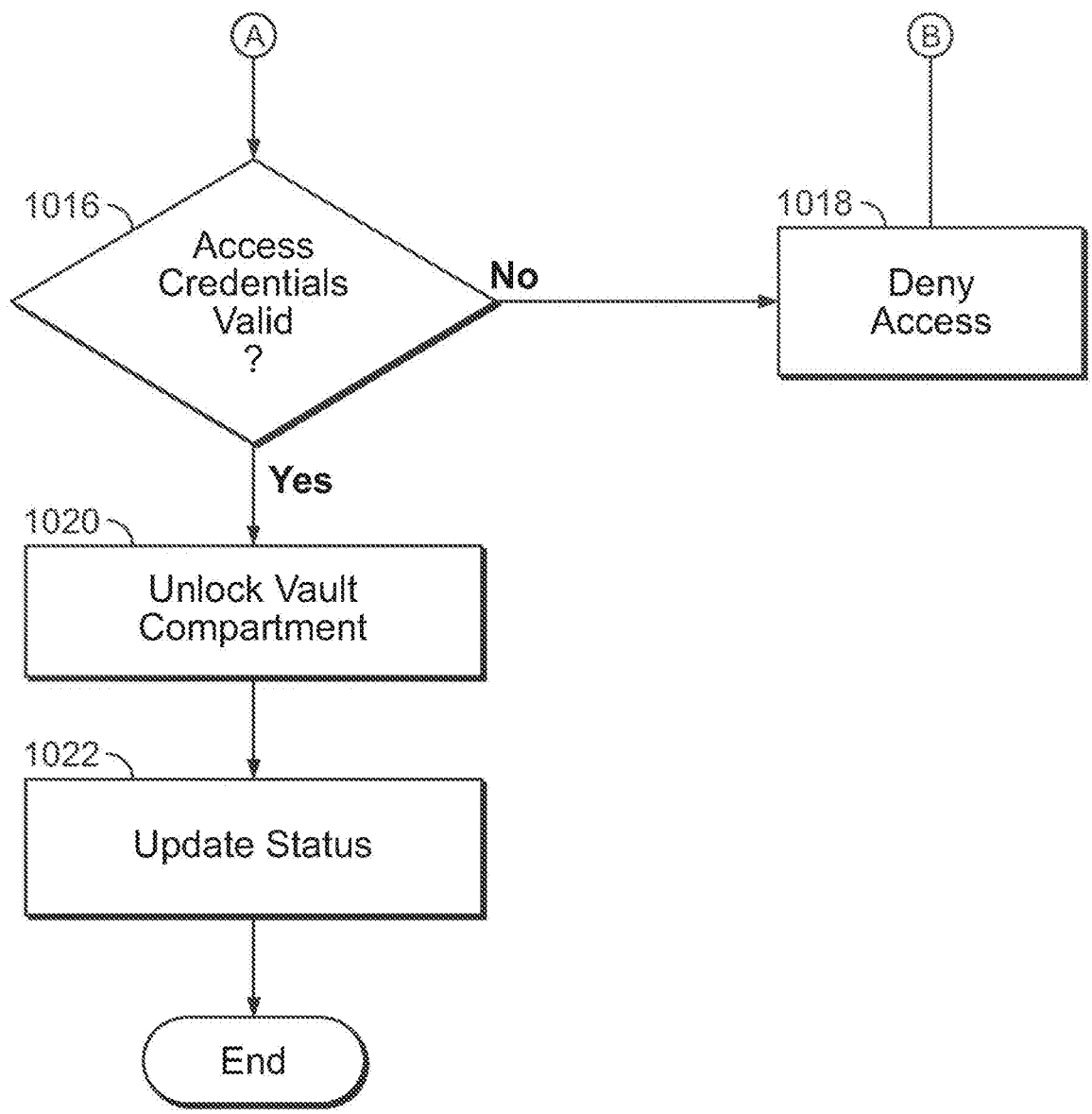

Referring to FIGS. 10A and 10B, a control process performed by the control system of one of container vaults $104_1$-$104_n$ (e.g. container vault 104 described above in connection with FIGS. 3-8) in accordance with one example is described with reference to steps 1000-1022.

In step 1000, the control system of container vault 104 receives package data for a medication package along with an assigned GUID from central server 102. The package data includes configuration data that identifies at least one environmental property setting to be used for storage of the medication package within container 500, as well as user access data that identifies at least one authorized user permitted to retrieve the medication package from the container vault. Of course, it should be understood that other information is also included in the package data, as described above. The GUID corresponds to the vault compartment of container vault 104 in which the medication package is to be placed.

In step 1002, the control system of container vault 104 primes the container 500 within the vault compartment associated with the GUID. Specifically, the environmental conditions within container 500 are adjusted to achieve the environmental property settings included in the package data. As described above, the control system transmits the environmental property settings received from central server 102 to electronic circuit 610 of flooring section 600 of container 500, which controls the adjustment of the environmental conditions within container 500 to achieve the environmental property settings. In some embodiments, the control system automatically transmits the environmental property settings to electronic circuit 610 upon receipt of the package data from central server 102 (or within a predetermined amount of time thereafter). In other embodiments, the process is initiated by a technician responsible for preparing container 500 for receipt of the medication package, such as by entering commands via the user interface of touchscreen display 306 of container vault 104.

In step 1004, the control system of container vault 104 determines if the medication package has been placed in container 500 within the vault compartment associated with the GUID. Preferably, upon receipt of the medication package, a technician checks the medication package for quality and accuracy and then places the medication in container 500 of the appropriate vault compartment. In some embodiments, the control system determines that the medication package has been placed in container 500 if the technician has logged a vault entry time via the user interface of touchscreen display 306 of container vault 104. In other embodiments, the control system determines that the medication package has been placed in container 500 upon detection of the opening of the door of the vault compartment and/or detection of the weight of the medication package within container 500 (e.g., using a digital scale), in which case the vault entry time is automatically populated. If the medication package has not been placed in container 500, then the process returns to step 1004. However, if the medication package has been placed in container 500, then the status of the medication package is updated in step 1006.

In step 1008, the control system of container vault 104 transmits a notification to the consumer (i.e., the intended recipient) indicating that the medication package is ready for pickup. At this time, the consumer can be given the opportunity to update the list of collectors if desired. A PIN can also be provided within the notification, which can be used by the consumer to provide the appropriate access credentials at the time of pickup. Of course, it should be understood that the control system of container vault 104 could send a message to central server 102 indicating that the medication package is ready for pickup, in which case the notification to the consumer could originate from central server 102.

In step 1010, the control system of container vault 104 determines if a user has requested access to the container vault to retrieve the medication package from container 500. If not, then it is determined in step 1012 whether the amount of time that the medication package has been stored in container 500 is greater than a predetermined threshold. For example, an expiry time can be calculated based on the vault entry time, in which case it is determined whether the current time is past the expiry time. If not, then the process returns to step 1010. However, if the expiry time has passed, then, in step 1014, control system of container vault 104 transmits a notification to the consumer (i.e., the intended recipient) with a reminder that the medication package is ready for pickup. In some embodiments, the reminder notification can include an offer of a monetary discount (if the failure to retrieve the medication is due to financial issues) or can include educational materials (if the failure to retrieve the medication stems from ignorance on the benefits of the medication). These temporal settings would also enable insights into the expiration date of the medication. Again, it should be understood that this reminder notification could also originate from central server 102, as noted above.

In step 1016, if the user has requested access to the container vault to retrieve the medication package from container 500, then the control system determines if the access credentials provide by the user are valid. For example, the identity of the user can be determined from the information read by card reader 308 or barcode scanner 310 and compared to the identity of the intended recipient and/or collectors provided in the package data. If the user has input a PIN via the user interface of touchscreen display 306, then the PIN can be compared to the PIN provided to the consumer in the notifications sent in step 1008. If the access credentials are not valid, then access is denied in step 1018 and the process returns to step 1010. However, if the access credentials are valid, then the control system unlocks the door of the vault compartment at step 1020 to enable access to container 500 and the medication package stored therein. Then, in step 1022, the control system logs the time that the medication package is retrieved from the container vault and updates the status of the medication package. This information is also provided to central server 102 so as to update the package data in medication package database 208.

Of course, it should be understood that steps 1000-1022 are performed by the control system of each of the different container vaults in relation to each of the medication packages placed in the container of one of the vault compartments.

Container Group Assessment Process (Central Server)

Figure 11:
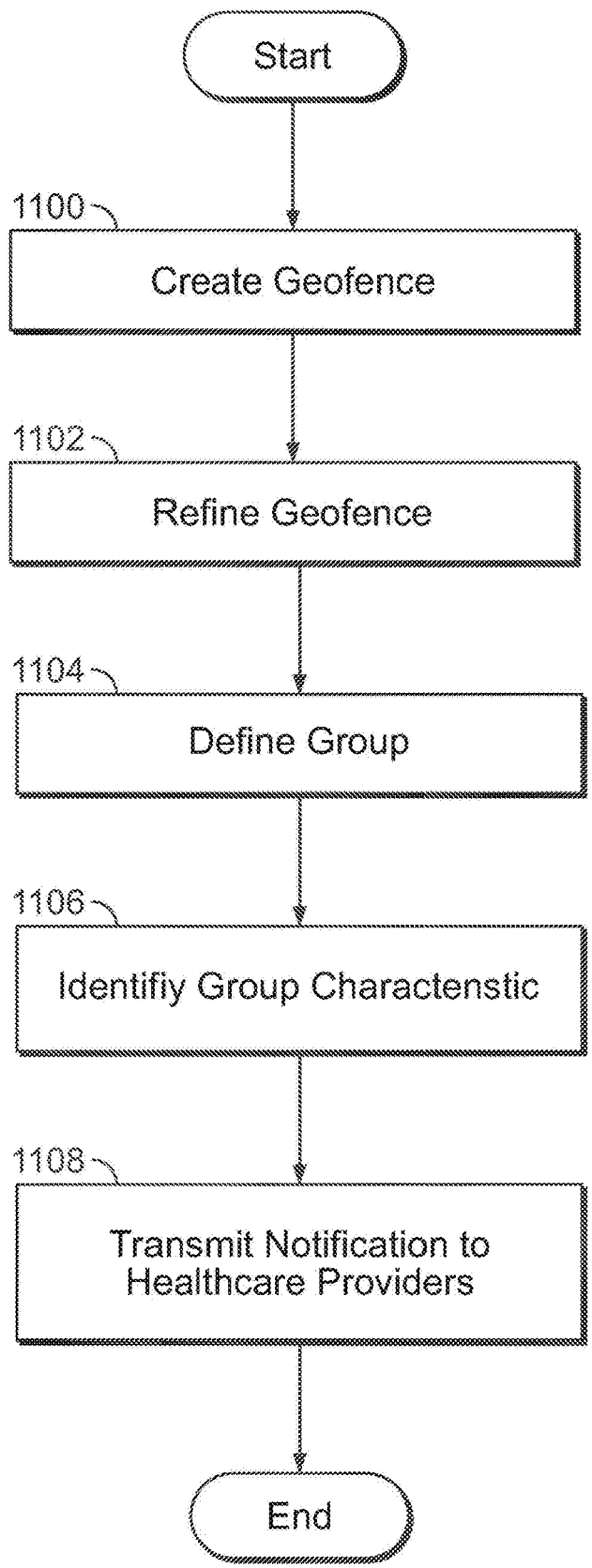
FIG. 11 is a process flow diagram of an exemplary method of tracking the group characteristics of various container vault groups as performed by the central server shown in FIG. 1.

Referring to FIG. 11, a container group assessment process performed by central server 102 in accordance with one example is described with reference to steps 1100-1108.

Figure 12:
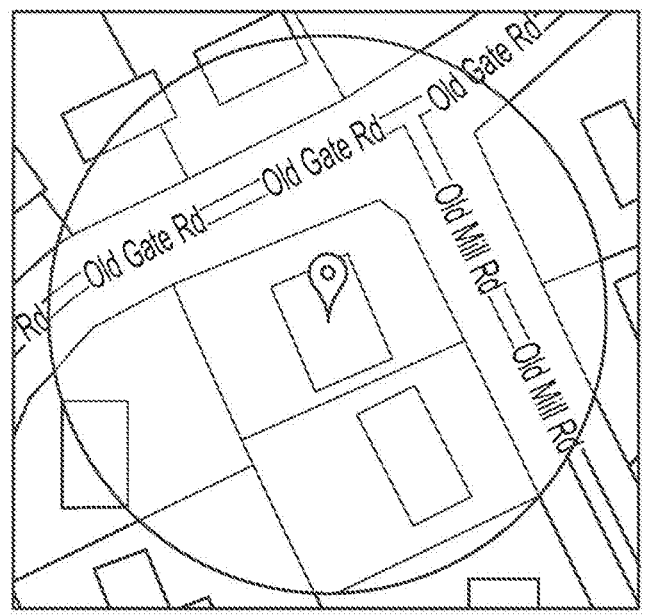
FIG. 12 depicts a circular geofence associated with one of the container vaults shown in FIG. 1.

In step 1100, central server 102 creates a geofence (i.e., a virtual fence or perimeter) around the physical location of one of container vaults $104_1$-$104_n$ (e.g. container vault 104 described above in connection with FIGS. 3-8). In some embodiments, central server 102 obtains the latitude/longitude coordinates of container vault 104 as provided by a GPS unit located within the vault structure. In other embodiments, the latitude/longitude coordinates of container vault 104 are previously stored in memory 202 of central server 102. A circular geofence is then created that is centered around the physical location of container vault 104. In this example, the radius of the circular geofence is set to three miles, i.e., the geofence covers all points located three miles or less from the vault location, although a different radius can be used with other container vaults. An example of a circular geofence is shown in FIG. 12.

Figure 13:
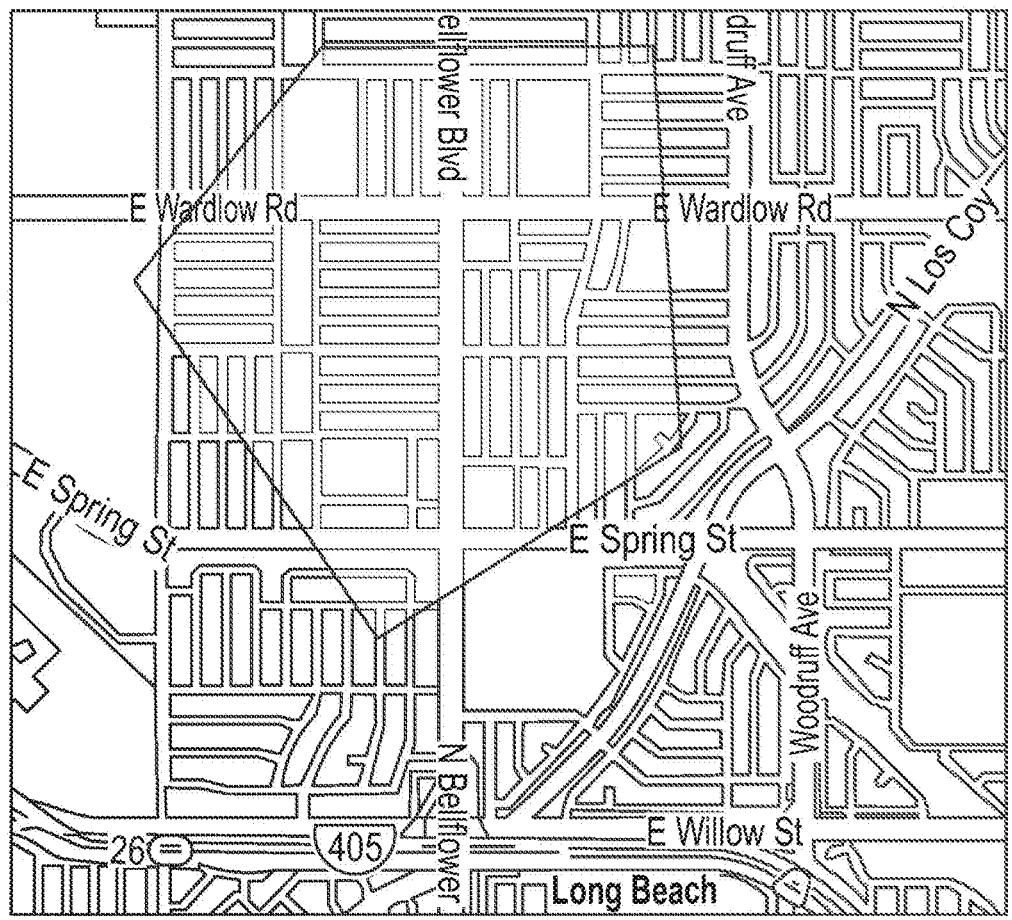
FIG. 13 depicts a polygon geofence associated with one of the container vaults shown in FIG. 1.

In step 1102, central server 102 refines the geofence based on the latitude/longitude coordinates of the home address of each consumer who retrieves a medication package from container vault 104 (either directly or through a designated collector), provided that the home address is located within the circular geofence. Each of these latitude/longitude coordinates are used to form a boundary node, and the boundary nodes are connected to form a polygon geofence. An example of a polygon geofence is shown in FIG. 13.

Figure 14:
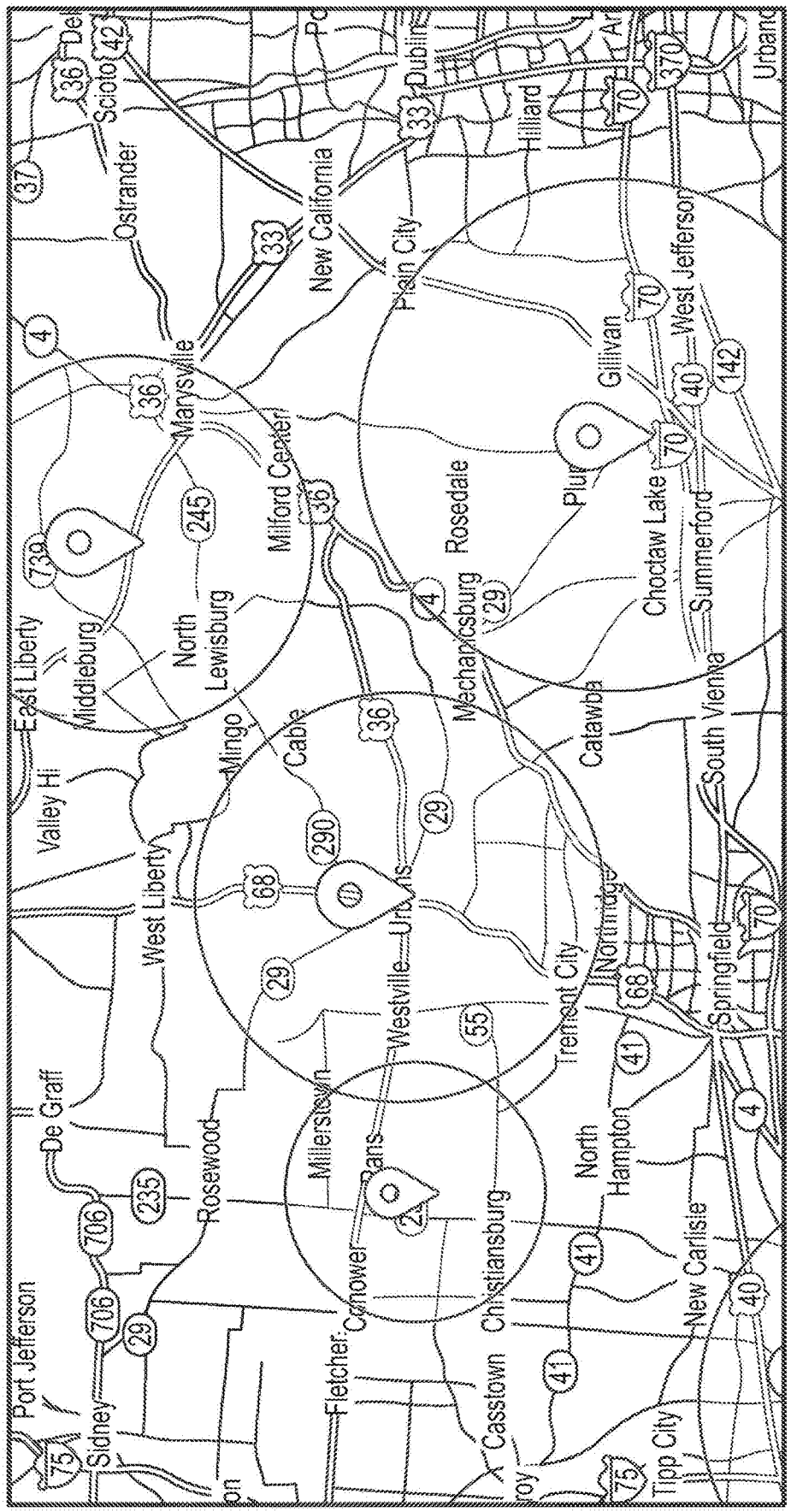
FIG. 14 depicts a group of the container vaults shown in FIG. 1 with their corresponding circular geofences.
Figure 15:
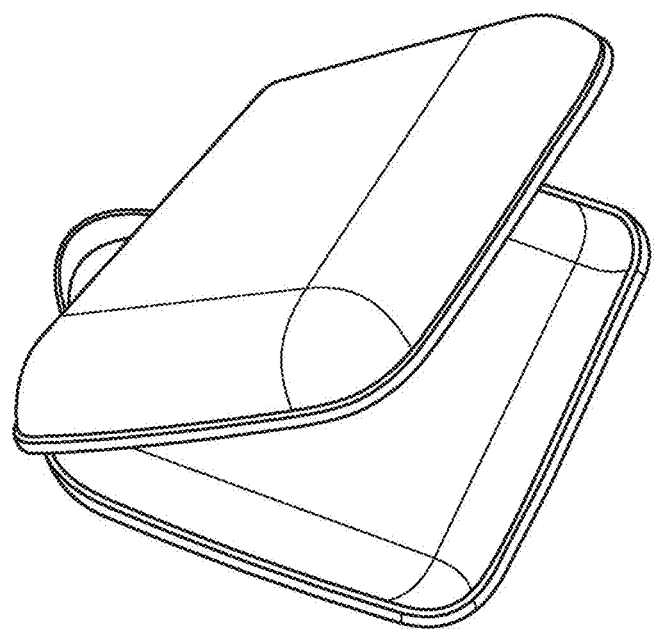
FIG. 15 is a front perspective view of a transportable container that can be placed in a compartment of the vault housing shown in FIGS. 3 and 4.
Figure 16:
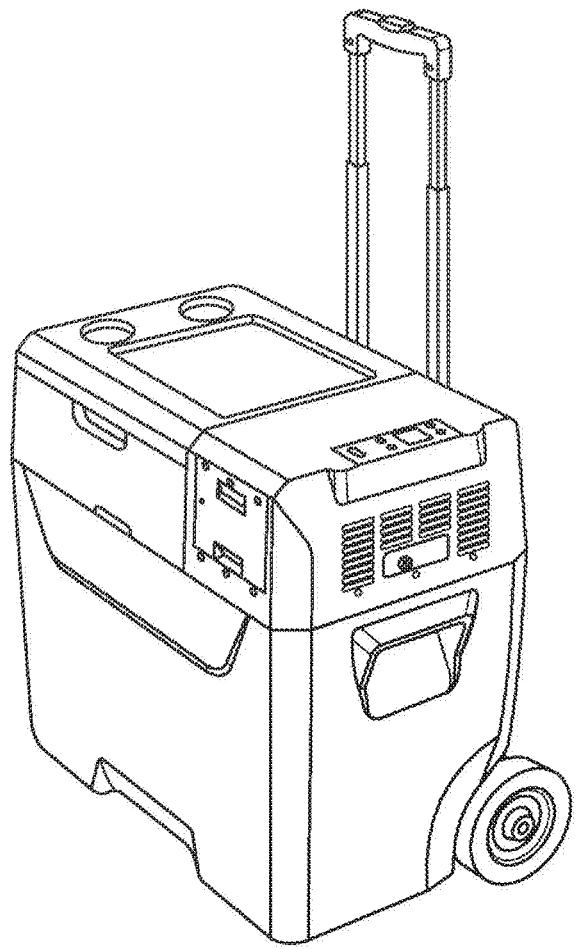
FIG. 16 is a front perspective view of an exemplary standalone container vault that can be used as one of the container vaults shown in FIG. 1.

In step 1104, central server 102 defines a container group that includes one or more of container vaults $104_1$-$104_n$ so as to form a container vault community. An example container group is shown in FIG. 14, which includes four container vaults located in relative close proximity to each other. In this example, each of the container vaults is associated with a circular geofence. Of course, a polygon geofence can alternatively be used in other examples.

In step 1106, central server 102 identifies a group characteristic associated with the container group and stores the group characteristic in container group database 210. The group characteristic can be identified based on an analysis of at least a portion of the package data for the medication packages retrieved from the container vaults within the group as stored in medication package database 208. In some embodiments, the group characteristic comprises a medical condition associated with the group. In other embodiments, the group characteristic comprises a medical supply needed for the group. Thus, central server 102 is able to identify the aggregate afflictions and medical needs of a community.

In step 1108, central server transmits a notification of the group characteristic to the servers $108_1$-$108_n$ of one or more health care providers who serve patients in proximity to the group. In some embodiments, the notification includes educational materials for a medical condition associated with the group. In other embodiments, the notification includes a medical supply list for the group. It should be understood that the notification can alert local medical facilities of a forthcoming medical condition and provide educational rubrics with the latest in findings on the medical condition as well as insights of medical supplies needed to treat the medical condition.

It should be understood that central server 102 can analyze the group data stored in container group database 210 in order to track a group characteristic within a group or track a group characteristic in relation to one or more additional groups. Trends of "community afflictions" can be tracked as they migrate from one area to another thereby enabling pandemic/flu tracking as the needs from one area spread or migrate entirely. As an example, central server 102 could identify the initial communities dealing with "advanced pneumonia" symptoms (such as those seen with Covid-19) and thereby allow for early quarantine and the acquisition of necessary personal protective equipment (PPE) and respiratory equipment. Central server 102 could also view the progression of a local population's health dynamics such that proactive actions are feasible by local clinicians, hospitals and other health care providers.

Central server 102 can also use the package data within medication package database 208 to provide other services. For example, central server 102 can analyze the medication package category tags in the package data for a particular medication package in combination with the personal health information (PHI) of the consumer to provide recommendations on available services (e.g., healthy catering options or dietary education classes to clients who order blood pressure medication).

Also, central server 102 can use the package data within medication package database 208 to provide both predictive and prescriptive analytical insights. Predictive analytics would leverage the package data to predict future trends, epidemic tracking, chronic conditional tracking, etc. For example, the package data for the medication packages stored in a particular container vault can be analyzed to determine the needs of the immediate area and also infer "community health conditions" for nearby container vaults. This feature can be used in conjunction with a hospital equipment registry to make more precise equipment inventory recommendations.

Prescriptive analytics would answer "what-if" lines of questioning to provide demand forecasting, predictive pricing strategies, and inventory management to enable dynamic supply chains. Dynamic supply chains would enable patient needs to be fulfilled faster and more efficiently, allowing for expansion into general vending kiosks or courier services for medical needs. Stock can be collocated where it is most needed as proven by community metrics and forecasting. In addition, stock can be moved at the forecasted conclusion of an impact zone and migrated to the next anticipated need-based location. This would be in contrast to conventional methods in which a general warehouse blindly ships items based on order status.

ALTERNATIVE EMBODIMENTS

Various alternative embodiments to system 100 as described above will be apparent to one skilled in the art.

For example, different types of containers can be used that have a configuration different from that of container 500 described above. For example, a brief-case style container, such as the container shown in FIG. 15, can be used to transport a medication package from the pharmaceutical fulfillment system to the vault location and then placed in a vault compartment of the container vault for retrieval by the consumer (or an individual on the collector list). This type of container includes its own rechargeable battery that can be charged at both the vault facility as well as at the consumer's home. The container includes components to control the environmental conditions within the container in order to protect the prescriptive medication stored therein. The consumer can return this container to the vault facility for transport back to the pharmaceutical fulfillment system.

Also, different types of container vaults can be used that have a configuration different from that of container vault 104 described above. For example, the container vault can comprise a single standalone enclosure, such as the chest-like vault shown in FIG. 16, with a container that holds a medication package transported from a pharmaceutical fulfillment system directly to a consumer's home. This type of container vault can be left in the consumer's driveway, and a transporter would have the appropriate access credentials to open the container vault and place the medication package therein. The container also includes components to control the environmental conditions within the container in order to protect the prescriptive medication stored therein. The environmental settings can be automatically set such that the desired temperature, pressure, etc. is achieved prior to arrival of the delivery truck. The container vault also provides secure access similar to the methods described above in connection with container vault 104 such that only trusted individuals are allowed access to its contents.

In addition, while container vault 104 described above includes features that provide secure access to the container and also control the environmental conditions within the container, other container vaults can be used that provide only one of these features (i.e., secure access or controlled environmental conditions, but not both). Further, while container vault 104 described above is used to store medication packages for retrieval by consumers, other types of products can also be placed in the secure containers, such as medical supplies and/or over-the-counter (OTC) generic medications for a wide range of ailments. Moreover, because the container vault can be located in any third party facility, it can provide a convenient option for consumers who do not have easy access to a designated pharmacy.

General Information

The description set forth above provides several exemplary embodiments of the inventive subject matter. Although each exemplary embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The use of any and all examples or exemplary language (e.g., "such as" or "for example") provided with respect to certain embodiments is intended merely to better describe the examples and does not pose a limitation on the scope of the disclosure. No language in the description should be construed as indicating any non-claimed element essential to the practice of the examples herein.

The use of the terms "comprises," "comprising," or any other variation thereof, are intended to cover a non-exclusive inclusion, such that a system or method that comprises a list of elements does not include only those elements, but can include other elements not expressly listed or inherent to such system or method.

Finally, while the present examples have been described and illustrated hereinabove with reference to various exemplary embodiments, it should be understood that various modifications could be made to these embodiments without departing from the scope of the disclosure. Therefore, the present disclosure is not to be limited to the specific systems or methods of the exemplary embodiments, except insofar as such limitations are included in the following claims.

We claim:

1. A computing system comprising:
   a processor; and
   a memory having a set of instructions, which when executed by the processor, causes the computing system to:
   generate, with a first electronic node, an index corresponding to provided data associated with an object repository, wherein the provided data corresponds to provided objects provided from the object repository;
   subdivide the index into partitions, wherein each of the partitions corresponds to a portion of the provided data;
   store the partitions and the portions of the provided data on second electronic nodes;
   identify, in real-time, at least one object part of the provided data from the second electronic nodes by executing, with the first electronic node, a search based on the partitions and a condition to retrieve the at least one object part from the second electronic nodes;
   extrapolate, in real-time, a first attribute associated with the condition based on the at least one object part;
   receive, in real-time, a request for a first object, wherein the first object is associated with a first user, wherein the first object is associated with the condition;
   determine, in real-time, whether to execute an automatic process to determine whether to permit the request based on the first attribute;
   when the automatic process is determined to be executed, automatically and in real-time analyze user data of the first user and an object attribute associated with the first object to determine whether to permit the request to provide the first object to the first user; and
   when the automatic process is determined not to be executed, assign the request to an electronic queue for a manual review to determine whether to permit the request.

2. The computing system of claim 1, wherein the instructions of the memory, when executed, cause the computing system to:
   determine an amount of times that objects of the provided objects associated with the condition were provided by the object repository based on the at least one object part, wherein the amount of times is the object attribute, and
   wherein to determine whether to execute the automatic process, the instructions of the memory, when executed, cause the computing system to determine whether the amount of times meets a threshold.

3. The computing system of claim 2, wherein the instructions of the memory, when executed, cause the computing system to:
   adjust the threshold based on a user attribute associated with the first user, or an attribute of the condition.

4. The computing system of claim 1, wherein the instructions of the memory, when executed, cause the computing system to:
   automatically initiate fulfillment of the request when the request is determined to be permitted.

5. The computing system of claim 1, wherein the instructions of the memory, when executed, cause the computing system to:
   set a geofence for the object repository;

identify a population with locations within the geofence, wherein the population includes users that received the provided objects from the object repository; and predict a future user attribute for the population based on the at least one object part, wherein to determine whether to execute the automatic process, the instructions of the memory, when executed, cause the computing system to determine whether to automatically analyze the request based on the future user attribute.

6. The computing system of claim 1, wherein:

the user data includes one or more of past data associated with the first user, current objects consumed by the first user or a current condition of the first user.

7. A computer readable storage medium comprising a set of executable program instructions, which when executed by a computing system, cause the computing system to:

generate, with a first electronic node, an index corresponding to provided data associated with an object repository, wherein the provided data corresponds to provided objects provided from the object repository;

subdivide the index into partitions, wherein each of the partitions corresponds to a portion of the provided data;

store the partitions and the portions of the provided data on second electronic nodes;

identify, in real-time, at least one object part of the provided data from the second electronic nodes by executing, with the first electronic node, a search based on the partitions and a condition to retrieve the at least one object part from the second electronic nodes;

extrapolate, in real-time, a first attribute associated with the condition based on the at least one object part;

receive, in real-time, a request for a first object, wherein the first object is associated with a first user, wherein the first object is associated with the condition;

determine, in real-time, whether to execute an automatic process to determine whether to permit the request based on the first attribute;

when the automatic process is determined to be executed, automatically and in real-time analyze user data of the first user and an object attribute associated with the first object to determine whether to permit the request to provide the first object to the first user; and when the automatic process is determined not to be executed, assign the request to an electronic queue for a manual review to determine whether to permit the request.

8. The computer readable storage medium of claim 7, wherein the instructions, when executed, further cause the computing system to:

determine an amount of times that objects of the provided objects associated with the condition were provided by the object repository based on the at least one object part, wherein the amount of times is the object attribute, and wherein to determine whether to execute the automatic process, the instructions, when executed, cause the computing system to determine whether the amount of times meets a threshold.

9. The computer readable storage medium of claim 8, wherein the instructions, when executed, further cause the computing system to:

adjust the threshold based on a user attribute associated with the first user, or an attribute of the condition.

10. The computer readable storage medium of claim 7, wherein the instructions, when executed, further cause the computing system to:

automatically initiate fulfillment of the request when the request is determined to be permitted.

11. The computer readable storage medium of claim 7, wherein the instructions, when executed, further cause the computing system to:

set a geofence for the object repository;

identify a population with locations within the geofence, wherein the population includes users that received the provided objects from the object repository; and predict a future user attribute for the population based on the at least one object part, wherein to determine whether to execute the automatic process, the instructions, when executed, further cause the computing system to determine whether to automatically analyze the request based on the future user attribute.

12. The computer readable storage medium of claim 7, wherein:

the user data includes one or more of past data associated with the first user, current objects consumed by the first user or a current condition of the first user.

13. A method comprising:

generating, with a first electronic node, an index corresponding to provided data associated with an object repository, wherein the provided data corresponds to provided objects provided from the object repository;

subdividing the index into partitions, wherein each of the partitions corresponds to a portion of the provided data;

storing the partitions and the portions of the provided data on second electronic nodes;

identifying, in real-time, at least one object part of the provided data from the second electronic nodes by executing, with the first electronic node, a search based on the partitions and a condition to retrieve the at least one object part from the second electronic nodes;

extrapolating, in real-time, a first attribute associated with the condition based on the at least one object part;

receiving, in real-time, a request for a first object, wherein the first object is associated with a first user, wherein the first object is associated with the condition;

determining, in real-time, whether to execute an automatic process to determine whether to permit the request based on the first attribute;

when the automatic process is determined to be executed, automatically and in real-time analyzing user data of the first user and an object attribute associated with the first object to determine whether to permit the request to provide the first object to the first user; and when the automatic process is determined not to be executed, assigning the request to an electronic queue for a manual review to determine whether to permit the request.

14. The method of claim 13, further comprising:

determining an amount of times that objects of the provided objects associated with the condition were provided by the object repository based on the at least one object part, wherein the amount of times is the object attribute, and wherein the determining whether to execute the automatic process includes determining whether the amount of times meets a threshold.

15. The method of claim 14, further comprising:

adjusting the threshold based on a user attribute associated with the first user, or an attribute of the condition.

16. The method of claim 13, further comprising:

automatically initiating fulfillment of the request when the request is determined to be permitted.

17. The method of claim 13, further comprising:
setting a geofence for the object repository;
identifying a population with locations within the geofence, wherein the population includes users that retrieved the provided objects from the object repository; and
predicting a future user attribute for the population based on the at least one object part,
wherein the determining whether to execute the automatic process comprises determining whether to automatically analyze the request based on the future user attribute, and
wherein the user data includes one or more of past data associated with the first user, current objects consumed by the first user or a current condition of the first user.

* * * * *